United States Patent
Seo et al.

(10) Patent No.: US 10,120,426 B2
(45) Date of Patent: Nov. 6, 2018

(54) THERMAL MANAGEMENT APPARATUS AND METHOD USING DYNAMIC THERMAL MARGIN, AND SEMICONDUCTOR PROCESSOR DEVICE, NON-VOLATILE DATA STORAGE DEVICE AND ACCESS CONTROL METHOD USING THE SAME

(71) Applicant: Research & Business Foundation Sungkyunkwan University, Suwon-si (KR)

(72) Inventors: Eui Seong Seo, Daejeon-si (KR); Nicolas Badano, Suwon-si (KR); Young Joo Woo, Ulsan-si (KR); Bon Keun Seo, Gwangju-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 93 days.

(21) Appl. No.: 15/221,909

(22) Filed: Jul. 28, 2016

(65) Prior Publication Data
US 2017/0177045 A1    Jun. 22, 2017

(30) Foreign Application Priority Data

Dec. 9, 2015  (KR) .................. 10-2015-0175285
Dec. 28, 2015 (KR) .................. 10-2015-0187539

(51) Int. Cl.
*G06F 1/20*    (2006.01)
*G06F 3/06*    (2006.01)

(52) U.S. Cl.
CPC ............ *G06F 1/206* (2013.01); *G06F 3/0611* (2013.01); *G06F 3/0619* (2013.01); *G06F 3/0653* (2013.01); *G06F 3/0659* (2013.01); *G06F 3/0679* (2013.01)

(58) Field of Classification Search
None
See application file for complete search history.

(56) References Cited

FOREIGN PATENT DOCUMENTS

| KR | 10-2013-0020624 A | 2/2013 |
|---|---|---|
| KR | 10-2013-0074293 A | 7/2013 |
| KR | 10-2014-0001902 A | 1/2014 |
| KR | 10-2015-0032314 A | 3/2015 |

OTHER PUBLICATIONS

Badano, N. "Thermal Margins: A Thermal Aware Scheduling Mechanism for Interactive Applications", Thesis (MA)—Sungkyunkwan University Graduate School: Electrical and Computer Engineering, 2015. 2.

*Primary Examiner* — Midys Rojas
(74) *Attorney, Agent, or Firm* — NSIP Law

(57) ABSTRACT

Disclosed herein are a thermal management apparatus and method using a dynamic thermal margin, and a semiconductor processor device, a non-volatile data storage device and an access control method using the same. The thermal management apparatus and method using a dynamic thermal margin, and the semiconductor processor device, non-volatile data storage device and access control method using the same can guarantee required performance based on importance and priority by scaling a thermal margin based on the importance of a task or the priority of threads, can control the generation of heat in a software manner while being compatible with non-volatile memory interface standards, and can also provide performance varying depending on the importance of a request that is being processed.

44 Claims, 10 Drawing Sheets

THERMAL MANAGEMENT APPARATUS AND METHOD USING DYNAMIC THERMAL MARGIN, AND SEMICONDUCTOR PROCESSOR DEVICE, NON-VOLATILE DATA STORAGE DEVICE AND ACCESS CONTROL METHOD USING THE SAME

CROSS-REFERENCE TO RELATED APPLICATIONS

This application claims the benefit under 35 USC 119(a) of Korean Patent Application No. 10-2015-0175285 filed on Dec. 9, 2015 and 10-2015-0187539 filed on Dec. 28, 2015 in the Korean Intellectual Property Office, the entire disclosure of which is incorporated herein by reference for all purposes.

BACKGROUND

1. Field

The following description relates to a thermal management apparatus and method of using a dynamic thermal margin, and a semiconductor processor device, a non-volatile data storage device, and an access control method using the same.

2. Description of Related Art

Semiconductor devices, such as semiconductor processors or semiconductor power devices, have a characteristic in which more leakage power is caused when temperature rises according to the general thermal characteristic of semiconductor material and the temperature further rises due to the generation of heat attributable to the more leakage power. Semiconductor devices operating at high temperature above a thermal limitation for a long time do not guarantee designed operating characteristics, and may generate an error or may be permanently damaged.

In general, a scheme for controlling the temperature of a semiconductor device may be classified as one of a method of sufficiently securing cooling capacity for externally discharging the generation of heat attributable to operation and a method of controlling the generation of heat. While the method of improving cooling efficiency or cooling capacity may be used in a design step, the method of controlling the generation of heat may be used in an actual use step.

Accordingly, a conventional real-time temperature management scheme for a semiconductor device operates in such a way as to lower frequency or operating voltage in order to reduce consumption power when the temperature of the semiconductor device rises or in such a way as to increase frequency or operating voltage when the temperature of the semiconductor device drops by taking into account designed cooling capacity.

For example, a conventional technology (Korean Patent Application Publication No. 10-2013-0020624) is configured to store process corners, voltage values and frequency values based on the operation modes of component parts within a semiconductor device in advance, to calculate a specific value while monitoring the operating parameters of the parts in real time, to compare the calculated value with the stored values, to predict a change in operation mode, and to control the operating mode.

In the conventional technology, several types of values regarding the manufacture and operation of the parts of a specific semiconductor device must have been stored in advance, and operating parameters, such as processor use efficiency, switching speed and/or data throughput in each operation mode of each semiconductor device must be calculated using a thermal management device. Accordingly, when the conventional technology is applied to different semiconductor devices, disadvantages arise in that data regarding the manufacture and operation of each semiconductor device needs to be separately accumulated and the configuration of thermal management hardware needs to be taken into account.

Although such a typical dynamic voltage frequency scaling (DVFS) scheme may guarantee the thermal safety of a semiconductor device in terms of temperature management, the deterioration of hardware performance is inevitable in a scheme for lowering voltage and frequency depending on temperature.

In particular, in mobile devices which have limited battery capacity and a limited heat-dissipation means and in which a change in the performance of hardware has a strong influence on a user experience, such as smartphones, the DVFS scheme may significantly deteriorate satisfaction for the devices.

Threads processed by a processor operate based on different priorities. For example, threads that directly interact with a user may have a relatively high priority, and threads that do not directly interact with a user may have a relatively low priority.

When threads having a high priority are executed after the processor has reached a very high temperature while executing threads having a low priority at high voltage and frequency, the processor may immediately reach a thermal limit. Accordingly, when the performance of the processor is decreased while the voltage and the frequency are being forced to be lowered, threads having a high priority cannot provide required user experience regardless of their high priority.

The problem in which the performance of an important task is not guaranteed by the temperature management function may occur in a storage device as well as a processor.

Non-volatile storage devices based on flash memory, such as solid state drives (SSDs), which have been widely used recently, replace typical hard disk drives (HDDs) as the main storage devices of systems. Furthermore, as the non-volatile memory host controller interface (NVMHCI) or the non-volatile memory express (NVMe), i.e., an interface standard for a non-volatile storage device, has emerged, a task can be processed at high performance, and thus the utilization range thereof has been expanded up to disk caches.

A high-capacity non-volatile storage device having high density and high performance needs to perform erase and program operations and a self-garbage collection operation in order to deal with a large amount of update data. The power consumption of a program operation and an erase operation is directly related to the generation of heat. Accordingly, the high-capacity non-volatile storage device has a heating problem that cannot be ignored.

Flash memory determines data by comparing a signal read from a cell with a reference level when performing a read operation, and needs to inject a predetermined quantity of charges into a corresponding floating gate electrode when performing a program operation. The generation of heat may disturb the reference level or the predetermined quantity of charges.

As described above, the generation of heat in itself generates several instant read/write error problems in a non-volatile data storage device, and may reduce the life span of a non-volatile data storage device in the long term.

The easiest method of solving the generation of heat is physically discharging heat. However, this method causes an increase in manufacturing expenses from the point of view of a manufacturer, and also causes larger and more cooling equipment, higher operating expenses, more energy consumption, and more greenhouse gas emission from the point of view of a consumer. Accordingly, for the thermal management of a non-volatile data storage device, it may be important to reduce the generation of heat itself without relying on physical heat-dissipation means.

Recent high-performance storage devices provide a thermal management function of stopping a task at a specific or higher temperature in order to protect apparatuses against problems occurring at high temperature. However, the storage devices have a problem in that they forcedly limit performance depending on a temperature regardless of the importance of a task that is being performed, but do not guarantee correct user experience unlike a processor.

In a memory device using a conventional flash memory technology, read/write access speeds are asymmetrical, an erase operation needs to be performed, the life span is short, and read and program operations are performed on a per-block basis and an erase operation is performed on a per-page basis through tradeoff between bandwidth and storage capacity.

A read operation consumes very low power because it requires only power for sensing word lines. A program operation consumes power about 10 to 20 times that of a read operation because charges need to be injected into the floating gate electrodes of cells within a block. An erase operation consumes power about 100 to 250 times that of a read operation because charges injected into the floating gate electrodes of all of cells within a page need to be discharged. Furthermore, in a total amount of heat generated, the amount of heat generated from a controller for driving an FTL in a non-volatile storage device is larger than that generated from memory cells.

Currently, the thermal management of a non-volatile storage device is problematic in that the thermal management is performed through the stopping of a task without taking into account the above-described device characteristics and cannot guarantee required performance based on the importance of a task.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

At least some embodiments are directed to the provision of a thermal management apparatus and method using a dynamic thermal margin, and a semiconductor processor device, a non-volatile data storage device and an access control method using the same.

At least some embodiments are directed to the provision of a thermal management method and apparatus, which can easily operate in conjunction with a hardware-wire temperature management scheme for a semiconductor processor device through a change in voltage and/or a frequency.

At least some embodiments are directed to the provision of a thermal management method and apparatus for a processor and a non-volatile data storage device, which can guarantee required performance for an important task or threads having a high priority.

At least some embodiments are directed to the provision of a non-volatile data storage device and a data access control method, which can control the generation of heat in a software manner while being compatible with a non-volatile memory interface standard.

In accordance with an aspect, there is provided a semiconductor processor device, including: a thermal margin determination unit configured to determine a thermal margin based on any one of the priority of threads being executed on one or more processor cores of a semiconductor processor device and the load of the processor cores; a thermal margin state determination unit configured to determine a thermal margin state based on a current temperature and the thermal margin of the semiconductor processor device; a policy determination unit configured to determine a thermal management policy regarding the processor cores based on the thermal margin state; and a processor core setting unit configured to set the activation, voltage and frequency of the processor cores in compliance with the thermal management policy; wherein the thermal margin defines the difference between a critical temperature which is a temperature adapted to protect the semiconductor processor device and a restrictive temperature which is a temperature adapted to cause a change in the thermal management policy; and wherein the thermal margin state is determined to be a state in which a current temperature is lower than the restrictive temperature or a state in which the current temperature is not lower than the restrictive temperature.

In accordance with an embodiment, the thermal margin determination unit may operate to determine the thermal margin to be smaller as the priority of the threads becomes higher or the load of the processor cores becomes higher.

In accordance with an embodiment, the thermal margin state determination unit may operate to determine the thermal margin state to be a first state when a current temperature is lower than the restrictive temperature, and to determine the thermal margin state to be a second state when the current temperature is higher than the restrictive temperature; and the policy determination unit may operate to maintain a current thermal management policy while the thermal margin state is the first state, and to repeatedly watch a change in the thermal management policy and a change in current temperature based on a changed thermal management policy until the current temperature becomes lower than the restrictive temperature while the thermal margin state is being in the second state.

In accordance with an embodiment, the thermal margin state determination unit may operate to: maintain the current thermal margin state in a first state when the current temperature is lower than the restrictive temperature while the current thermal margin state is being in the first state, and switch the current thermal margin state from the first state to a second state when the current temperature is higher than the restrictive temperature; switch the current thermal margin state to a third state when a thermal management policy is changed while the current thermal margin state is being in the second state; and switch the current thermal margin state to the second state when the current temperature is higher than a secondary restrictive temperature while the current thermal margin state is being in the third state, maintain the current thermal margin state in the third state when the current temperature is lower than the secondary restrictive temperature but is higher than a return temperature, and switch the current thermal margin state to the first state when the current temperature is lower than the return temperature; and the policy determination unit may operate to maintain the current thermal management policy while the thermal margin state is being in the first state, and to determine the thermal management policy so that the current temperature is lower than the secondary restrictive temperature or the return temperature while the thermal margin state is being in the second state.

In accordance with an embodiment, the secondary restrictive temperature and the return temperature may be determined based on the thermal margin.

In accordance with an embodiment, the current load may be a load related to the processing of the priority threads of threads being executed on the processor cores.

In accordance with another aspect, there is provided a thermal management apparatus, including: a thermal margin determination unit configured to determine a thermal margin based on any one of the priority of threads being executed on one or more processor cores of a semiconductor processor device and the load of the processor cores; a thermal margin state determination unit configured to determine a thermal margin state based on a current temperature and thermal margin of the semiconductor processor device; and a policy determination unit configured to determine a thermal management policy regarding the processor cores based on the thermal margin state; wherein the thermal margin defines a difference between a critical temperature which is a temperature adapted to protect the semiconductor processor device and a restrictive temperature which is a temperature adapted to cause a change in the thermal management policy; and wherein the thermal margin state is determined to be a state in which a current temperature is lower than the restrictive temperature or a state in which the current temperature is not lower than the restrictive temperature.

In accordance with an embodiment, the thermal margin determination unit may operate to determine the thermal margin to be smaller as the priority of the threads becomes higher or the load of the processor cores becomes higher.

In accordance with an embodiment, the thermal margin state determination unit may operate to determine the thermal margin state to be a first state when a current temperature is lower than the restrictive temperature, and to determine the thermal margin state to a second state when the current temperature is higher than the restrictive temperature; and the policy determination unit may operate to maintain a current thermal management policy while the thermal margin state is being in the first state, and to repeatedly watch a change in the thermal management policy and a change in current temperature based on a changed thermal management policy until the current temperature is lower than the restrictive temperature while the thermal margin state is being in the second state.

In accordance with an embodiment, the thermal margin state determination unit may operate to: maintain a current thermal margin state in a first state when the current temperature is lower than the restrictive temperature while the current thermal margin state is being in the first state, and switch the current thermal margin state from the first state to a second state when the current temperature is higher than the restrictive temperature; switch the current thermal margin state to a third state when a thermal management policy is changed while the current thermal margin state is being in the second state; and switch the current thermal margin state to the second state when the current temperature is higher than a secondary restrictive temperature while the current thermal margin state is being in the third state, maintain the current thermal margin state in the third state when the current temperature is lower than the secondary restrictive temperature but is higher than a return temperature, and switch the current thermal margin state to the first state when the current temperature is lower than the return temperature; and the policy determination unit may operate to maintain the current thermal management policy while the thermal margin state is being in the first state or the third state, and to determine the thermal management policy so that the current temperature is lower than the secondary restrictive temperature or the return temperature while the thermal margin state is being in the second state.

In accordance with an embodiment, the secondary restrictive temperature and the return temperature may be determined based on the thermal margin.

In accordance with an embodiment, the current load may include a load related to the processing of the priority threads of threads being executed on the processor cores.

In accordance with an embodiment, the thermal management apparatus may further include a scheduler configured to operate to classify threads being executed on the processor cores into priority threads and non-priority threads, and to control time slices allocated to the non-priority threads in compliance with a thermal management policy.

In accordance with an embodiment, the thermal management apparatus may further include a high performance burst situation watch unit configured to watch occurrence of a high performance burst situation in which a load related to priority threads of threads being executed on the processor cores exceeds a threshold load and to generate a high performance burst request when the high performance burst situation is detected; and the policy determination unit may operate to select a processor core setting, providing higher performance than current performance, from among a plurality of processor core settings when a high performance burst request is received from the high performance burst situation watch unit and to determine a thermal management policy based on the selected processor core setting.

In accordance with still another aspect, there is provided a thermal management method for a semiconductor processor device including one or more processor cores, including: determining a thermal margin based on any one of a priority of threads being executed on the processor cores and a load of the processor cores; determining a thermal margin state based on a current temperature and thermal margin of the semiconductor processor device; and determining a thermal management policy regarding the processor cores based on the thermal margin state; wherein the thermal margin defines a difference between a critical temperature which is a temperature adapted to protect the semiconductor processor device and a restrictive temperature which is a temperature adapted to cause a change in the thermal management policy; and wherein the thermal margin state is determined to be a state in which a current temperature is lower than the restrictive temperature or a state in which the current temperature is not lower than the restrictive temperature.

In accordance with an embodiment, the thermal management method may further include controlling the activation, voltage and frequency of the processor cores in compliance with the thermal management policy.

In accordance with an embodiment, determining the thermal margin may include determining the thermal margin to be smaller as the priority of the threads becomes higher or the load of the processor cores becomes larger.

In accordance with an embodiment, determining the thermal margin state may include determining the thermal margin state to be a first state when a current temperature is lower than the restrictive temperature, and determining the thermal margin state to be a second state when the current temperature is higher than the restrictive temperature; and determining the thermal management policy may include maintaining the current thermal management policy while the thermal margin state is being in the first state, and repeatedly watching a change in the thermal management policy and a change in the current temperature based on a changed thermal management policy until the current temperature is lower than the restrictive temperature while the thermal margin state is being in the second state.

In accordance with an embodiment, determining the thermal margin state may include:

maintaining the current thermal margin state in a first state when the current temperature is lower than the restrictive temperature while the current thermal margin state is being in the first state, and switching the current thermal margin state from the first state to a second state when the current temperature is higher than the restrictive temperature; switching the current thermal margin state to a third state when the thermal management policy is changed while the current thermal margin state is being in the second state; and switching the current thermal margin state to the second state when the current temperature is higher than a secondary restrictive temperature while the current thermal margin state is being in the third state, maintaining the current thermal margin state in the third state when the current temperature is lower than the secondary restrictive temperature but is higher than a return temperature, and switching the current thermal margin state to the first state when the current temperature is lower than the return temperature; and determining the thermal management policy may include maintaining the current thermal management policy while the thermal margin state is being in the first state, and determining the thermal management policy so that the current temperature is lower than the secondary restrictive temperature or the return temperature while the thermal margin state is being in the second state.

In accordance with an embodiment, the secondary restrictive temperature and the return temperature may be determined based on the thermal margin.

In accordance with an embodiment, the current load may be a load related to the processing of the priority threads of threads being executed on the processor cores.

In accordance with an embodiment, the thermal management method may further include classifying threads being executed on the processor cores into priority threads and non-priority threads, and controlling time slices allocated to the non-priority threads in compliance with the thermal management policy.

In accordance with an embodiment, the thermal management method may further include watching the occurrence of a high performance burst situation in which a load related to priority threads of threads being executed on the processor cores exceeds a threshold load, and generating a high performance burst request when the high performance burst situation is detected; and determining the thermal management policy may include selecting a processor core setting, providing higher performance than current performance, from among a plurality of processor core settings in response to a high performance burst request, and determining the thermal management policy based on the selected processor core setting.

In accordance with still another aspect, there is provided a non-volatile data storage device, including: one or more non-volatile memory modules; an I/O queue reception unit configured to receive one or more I/O queues including I/O commands regarding one or more logical storage spaces from one or more hosts; a thermal margin determination unit configured to determine a thermal margin of the I/O queues based on at least one of a priority assigned to the I/O queues, the type of I/O commands and the length of the I/O queues; a thermal margin state determination unit configured to determine a thermal margin state of the I/O queue based on the thermal margin and a current temperature of a non-volatile memory module selected for the I/O queues from among the non-volatile memory modules; an execution sequence arbitration unit configured to arbitrate an execution sequence of the I/O commands constituting the I/O queues based on the thermal margin state of the respective I/O queues; and an I/O command execution unit configured to execute the I/O commands based on the arbitrated execution sequence; wherein the thermal margin defines a difference between a critical temperature adapted to protect the non-volatile memory modules and a restrictive temperature adapted to cause switching of the thermal margin state; and wherein the thermal margin state is determined to be a normal state in which a current temperature is lower than the restrictive temperature or a restriction state in which the current temperature is higher than the restrictive temperature.

In accordance with an embodiment, the thermal margin determination unit may operate to determine the thermal margin of the I/O queue to be smaller as a priority assigned to the I/O queue by the host is higher when the I/O queues include read commands or a length of the I/O queues is shorter.

In accordance with an embodiment, the execution sequence arbitration unit may operate to maintain or extend a burst size for I/O commands belonging to an I/O queue having the thermal margin state of the normal state, to reduce a burst size for I/O commands belonging to an I/O queue having the thermal margin state of the restriction state, and to arbitrate the execution sequence of the I/O commands based on the burst size.

In accordance with an embodiment, the execution sequence arbitration unit may operate to set the priority of the I/O queues again so that I/O commands belonging to an I/O queue having the thermal margin state of the normal state have priority over I/O commands belonging to an I/O queue having the thermal margin state of the restriction state, and to arbitrate an execution sequence of the I/O commands based on the priority.

In accordance with an embodiment, the execution sequence arbitration unit may operate to arbitrate the execution sequence of I/O commands of at least one I/O queue according to weighted round robin arbitration based on the priority.

In accordance with an embodiment, the non-volatile data storage device may further include a performance restriction watch unit configured to watch the occurrence of a danger temperature situation in which the current temperature of the non-volatile memory modules exceeds the critical temperature and to generate a performance restriction request for a non-volatile memory module in which the danger temperature situation has occurred and a performance restriction release request for a non-volatile memory module in which the danger temperature situation has been terminated; the I/O command execution unit may operate to delay execution of I/O commands regarding a non-volatile memory module in which the danger temperature situation has occurred until a performance restriction release request is received when a performance restriction request is received from the performance restriction watch unit.

In accordance with an embodiment, a non-volatile memory module accessed in connection with the I/O queue may be preferentially selected from among non-volatile memory modules having a relatively low current temperature when the I/O queues include program commands issued by a host, flush commands or programs command based on garbage collection.

In accordance with an embodiment, the non-volatile data storage device may further include a garbage collection processing unit configured to monitor non-volatile memory modules, requiring garbage collection, among the non-volatile memory modules and non-volatile memory modules, having marginal spaces, among the non-volatile memory modules, to generate a garbage collection I/O queue including I/O commands related to processing of garbage collection and having a specific priority when garbage collection is determined to be required, and to send the garbage collection I/O queue to the I/O queue reception unit.

In accordance with still another aspect, there is provided a thermal management apparatus for a non-volatile data storage device, including one or more non-volatile memory modules, an I/O queue reception unit configured to receive one or more I/O queues including I/O commands regarding one or more logical storage spaces from one or more hosts, an execution sequence arbitration unit configured to arbitrate an execution sequence based on a burst size in connection with the I/O commands constituting the I/O queues, and an I/O command execution unit configured to execute the I/O commands according to the arbitrated execution sequence, wherein the thermal management apparatus includes: a thermal margin determination unit configured to determine a thermal margin of the I/O queue based on at least one of a priority assigned to the I/O queues, the type of I/O commands and the length of the I/O queues; a thermal margin state determination unit configured to determine a thermal margin state of the I/O queues based on the thermal margin and a current temperature of a non-volatile memory module selected for the I/O queues from among the non-volatile memory modules; and a dynamic performance control unit configured to maintain or extend a burst size for I/O commands belonging to an I/O queue having the thermal margin state of a normal state, and to reduce a burst size for I/O commands belonging to an I/O queue having the thermal margin state of a restriction state; wherein the thermal margin defines a difference between a critical temperature adapted to protect the non-volatile memory modules and a restrictive temperature adapted to cause switching of the thermal margin state; and wherein the thermal margin state is determined to be the normal state in which a current temperature is lower than the restrictive temperature or the restriction state in which the current temperature is higher than the restrictive temperature.

In accordance with still another aspect, there is provided a thermal management apparatus for a non-volatile data storage device, including one or more non-volatile memory modules, an I/O queue reception unit configured to receive one or more I/O queues including I/O commands regarding one or more logical storage spaces from one or more hosts, an execution sequence arbitration unit configured to arbitrate an execution sequence based on a priority in connection with the I/O commands constituting the I/O queues, and an I/O command execution unit configured to execute the I/O commands according to the arbitrated execution sequence, wherein the thermal management apparatus includes: a thermal margin determination unit configured to determine a thermal margin of the I/O queue based on at least one of a priority assigned to the I/O queues, the type of I/O commands and the length of the I/O queues; a thermal margin state determination unit configured to determine a thermal margin state of the I/O queue based on the thermal margin and a current temperature of a non-volatile memory module selected for the I/O queues from among the non-volatile memory modules; and a dynamic performance control unit configured to maintain or extend a burst size for I/O commands belonging to an I/O queue having the thermal margin state of a normal state, and to reduce a burst size for I/O commands belonging to an I/O queue having the thermal margin state of a restriction state; wherein the thermal margin defines a difference between a critical temperature adapted to protect the non-volatile memory modules and a restrictive temperature adapted to cause switching of the thermal margin state; and wherein the thermal margin state is determined to be a normal state in which a current temperature is lower than the restrictive temperature or a restriction state in which the current temperature is higher than the restrictive temperature.

In accordance with still another aspect, there is provided a data access control method for a non-volatile data storage device including one or more non-volatile memory modules, wherein the data access control method performed by the non-volatile data storage device includes: receiving one or more I/O queue including I/O commands regarding one or more logical storage spaces from one or more host; determining a thermal margin of the I/O queue based on at least one of a priority assigned to the I/O queues, the type of I/O commands and the length of the I/O queues; determining a thermal margin state of the I/O queue based on a current temperature and thermal margin of a non-volatile memory module selected for the I/O queues from among the non-volatile memory modules; arbitrating an execution sequence in connection with the I/O commands constituting the I/O queues based on the thermal margin state of the respective I/O queues; and executing the I/O commands according to the arbitrated execution sequence; wherein the thermal margin defines a difference between a critical temperature adapted to protect the non-volatile memory modules and a restrictive temperature adapted to cause switching of the thermal margin state; and wherein the thermal margin state is determined to be a normal state in which a current temperature is lower than the restrictive temperature or a restriction state in which the current temperature is higher than the restrictive temperature.

In accordance with an embodiment, the thermal margin of the I/O queues may be determined to be smaller as the priority assigned to the I/O queue by the host is higher when the I/O queues include read commands or a length of the I/O queues is shorter.

In accordance with an embodiment, arbitrating the execution sequence may include: maintaining or extending a burst size for I/O commands belonging to an I/O queue having the thermal margin state of the normal state; reducing a burst size for I/O commands belonging to an I/O queue having the thermal margin state of the restriction state; and arbitrating the execution sequence of the I/O commands based on the burst size.

In accordance with an embodiment, arbitrating the execution sequence may include: setting a priority of I/O queues again so that I/O commands belonging to an I/O queue having the thermal margin state of the normal state have priority over I/O commands belonging to an I/O queue having the thermal margin state of the restriction state; and arbitrating the execution sequence of the I/O commands based on the priority.

In accordance with an embodiment, arbitrating the execution sequence may include arbitrating an execution sequence of I/O commands of at least one I/O queue according to weighted round robin arbitration based on the priority.

In accordance with an embodiment, the data access control method may further include watching the occurrence of a danger temperature situation in which the current temperature of the non-volatile memory modules exceeds the critical temperature, and generating a performance restriction request for a non-volatile memory module in which the danger temperature situation has occurred and a performance restriction release request for a non-volatile memory module in which the danger temperature situation has been terminated; and executing the I/O commands may include delaying an execution of I/O commands regarding a non-volatile memory module in which the danger temperature situation has occurred until a performance restriction release request is received when a performance restriction request is received from the performance restriction watch unit.

In accordance with an embodiment, a non-volatile memory module accessed in connection with the I/O queues may be preferentially selected from among non-volatile memory modules having a relatively low current temperature when the I/O queues include program commands issued by a host, flush commands or program commands based on garbage collection.

In accordance with an embodiment, the data access control method may further include generating a garbage collection I/O queue using I/O commands and a specific priority regarding processing of garbage collection when the garbage collection is determined to be required.

In accordance with still another aspect, there is provided a thermal management method for a non-volatile data storage device including one or more non-volatile memory modules, an I/O queue reception unit configured to receive one or more I/O queues including I/O commands regarding one or more logical storage spaces from one or more hosts, an execution sequence arbitration unit configured to arbitrate an execution sequence based on a burst size in connection with the I/O commands constituting the I/O queues, and an I/O command execution unit configured to execute the I/O commands according to the arbitrated execution sequence, wherein the thermal management method performed by a thermal management apparatus includes: determining the thermal margin of the I/O queue based on at least one of a priority assigned to the I/O queues, the type of I/O commands and the length of the I/O queues; determining a thermal margin state of the I/O queue based on the thermal margin and a current temperature of a non-volatile memory module selected for the I/O queues from among the non-volatile memory modules; and determining a burst size by maintaining or extending a burst size for I/O commands belonging to an I/O queue having the thermal margin state of a normal state, and reducing a burst size for I/O commands belonging to an I/O queue having the thermal margin state of a restriction state; wherein the thermal margin defines a difference between a critical temperature adapted to protect the non-volatile memory modules and a restrictive temperature adapted to cause switching of the thermal margin state; and wherein the thermal margin state is determined to be the normal state in which a current temperature is lower than the restrictive temperature or the restriction state in which the current temperature is higher than the restrictive temperature.

In accordance with an embodiment, the thermal management method may further include: watching the occurrence of a danger temperature situation in which the current temperature of the non-volatile memory modules exceeds the critical temperature; and generating a performance restriction request for a non-volatile memory module in which the danger temperature situation has occurred and a performance restriction release request for a non-volatile memory module in which the danger temperature situation has been terminated.

In accordance with still another aspect, there is provided a thermal management method for a non-volatile data storage device including one or more non-volatile memory modules, an I/O queue reception unit configured to receive one or more I/O queues including I/O commands regarding one or more logical storage spaces from one or more hosts, an execution sequence arbitration unit configured to arbitrate an execution sequence based on a burst size in connection with the I/O commands constituting the I/O queues, and an I/O command execution unit configured to execute the I/O commands according to the arbitrated execution sequence, wherein the thermal management method performed by a thermal management apparatus includes: determining the thermal margin of the I/O queue based on at least one of a priority assigned to the I/O queues, the type of I/O commands and the length of the I/O queues; determining the thermal margin state of the I/O queues based on the thermal margin and the current temperature of a non-volatile memory module selected for the I/O queues from among the non-volatile memory modules; and setting the priority of the I/O queues again so that I/O commands belonging to an I/O queue having the thermal margin state of a normal state have priority over I/O commands belonging to an I/O queue having the thermal margin state of a restriction state; wherein the thermal margin defines the difference between a critical temperature adapted to protect the non-volatile memory modules and a restrictive temperature adapted to cause switching of the thermal margin state; and wherein the thermal margin state is determined to be the normal state in which a current temperature is lower than the restrictive temperature or the restriction state in which the current temperature is higher than the restrictive temperature.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
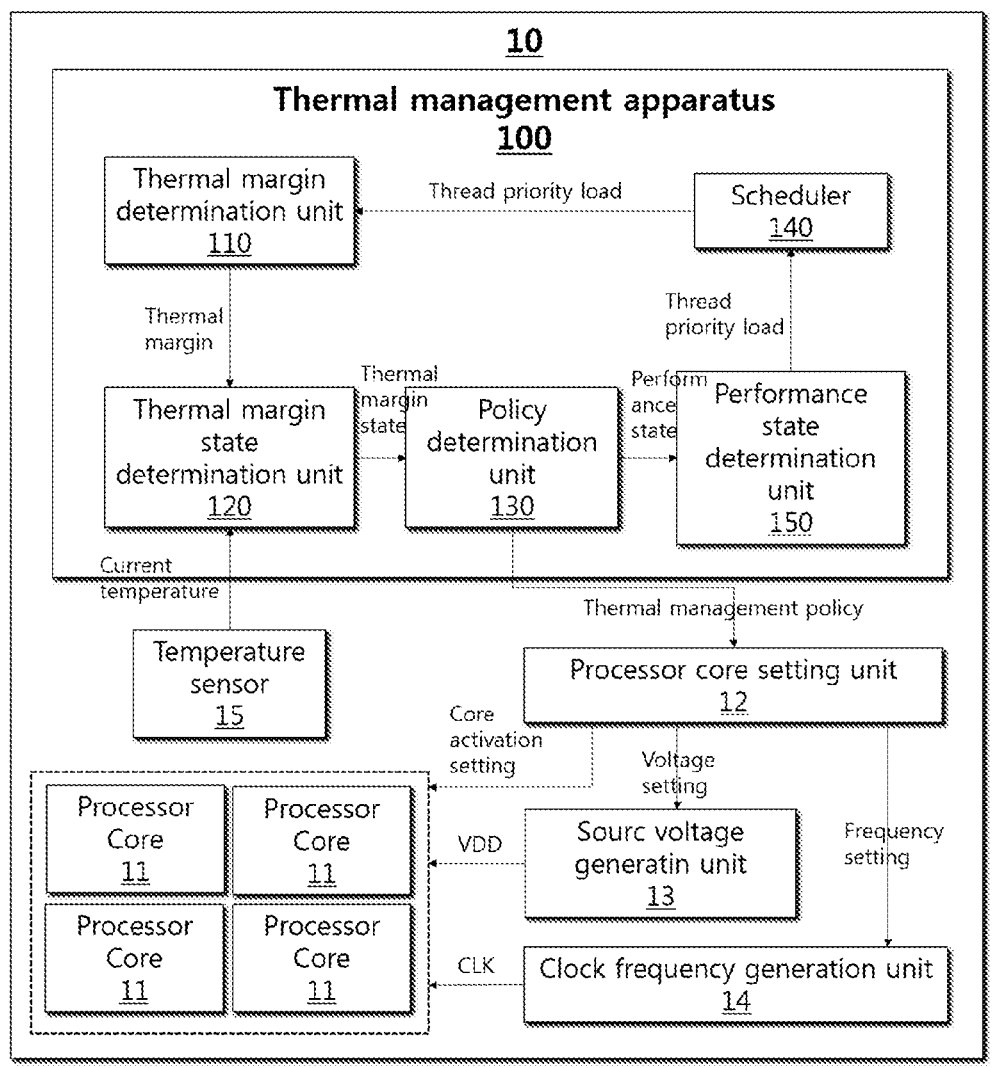
FIG. 1 is a block diagram illustrating a thermal management apparatus for a semiconductor processor device according to an embodiment.

FIG. 1 is a block diagram illustrating a thermal management apparatus for a semiconductor processor device according to an embodiment.

Referring to FIG. 1, a semiconductor processor device 10 may include one or more processor cores 11, a processor core setting unit 12, a source voltage generation unit 13, a clock frequency generation unit 14, a temperature sensor 15, and a thermal management apparatus 100.

The processor cores 11 may be activated or deactivated individually, and may be driven at different voltages or different clock frequencies when required.

The processor core setting unit 12 stores a plurality of processor core settings which may be combined in connection with whether a processor core has been activated, voltage, and frequency. Accordingly, the processor core setting unit 12 may select one of the plurality of processor core settings in compliance with internal determination or an external instruction, for example, a thermal management policy determined by the thermal management apparatus 100, and may determine processor cores to be activated and a source voltage or clock frequency to be supplied according to the selected processor core setting.

The source voltage generation unit 13 generates a source voltage VDD based on the voltage setting of the processor core setting selected by the processor core setting unit 12, and supplies the generated source voltage to the activated processor cores 11.

The clock frequency generation unit 14 generates a clock frequency CLK based on the frequency setting of the processor core setting selected by the processor core setting unit 12, and supplies the generated clock frequency to the processor cores 11.

The temperature sensor 15 may calculate the temperature values of the respective processor cores 11 or calculate a single temperature value representative of the thermal states of the semiconductor processor device 10.

Semiconductor processor devices that have been recently released adopt a DVFS scheme for comparing a current temperature with a critical temperature and dynamically scaling voltage and frequency in order to guarantee experienced performance while controlling temperature. The critical temperature is a temperature determined by the thermal design powers (TDPs) of semiconductor processor devices. When a critical temperature is reached, performance may be deteriorated, a normal operation may not be guaranteed, or the life span of a product may be influenced.

Since such existing temperature control schemes respond immediately and very actively perform scaling based on the comparison between the current temperature and critical temperature of a semiconductor processor device, the performance thereof may changes instantaneously. An application requiring high performance consumes a lot of power, and thus immediately raises the temperature of a processor device. Accordingly, while an application requiring no high performance is being executed, a processor device is in the state of being cooled and, thus, has high potential performance. However, when high performance is required, the processor device is excessively heated and voltage and frequency are lowered, so that the process device may not have appropriate performance.

In contrast, the thermal management apparatus 100 according to embodiments may include a thermal margin determination unit 110, a thermal margin state determination unit 120, and a policy determination unit 130 in order to secure performance despite a change in the dynamic temperature of the processor cores 11.

In an embodiment, the thermal management apparatus 100 may further include a scheduler 140, and a performance state determination unit 150.

The thermal margin determination unit 110 may determine the size of a thermal margin based on at least one of priority information of threads, which are being executed or are to be executed, and the load information of the processor cores 11. As will be defined below, the thermal margin refers to the difference between a critical temperature, i.e., a temperature against which the semiconductor processor device 10 must be protected, and a restrictive temperature, i.e., a temperature at which a change of thermal management policy is triggered.

More specifically, the thermal margin determination unit 110 may determine the size of the thermal margin to be smaller as the priority of threads becomes higher, and thus may set the restrictive temperature to a higher value.

More specifically, the thermal margin determination unit 110 may determine the size of the thermal margin to be smaller as the load of the processor cores 11 becomes higher, and thus may set the restrictive temperature to a higher value.

More specifically, the thermal margin determination unit 110 may determine the size of the thermal margin to be small as the weighted sum of priorities of threads and the loads of the processor cores 11 becomes higher, and thus may set the restrictive temperature to a higher value.

The thermal margin state determination unit 120 may determine a thermal margin state based on the size of the thermal margin and the current temperature.

In this case, the priority, which is a criterion for determining the thermal margin, may be determined by converting the importance or required performance value of each task or each thread. Alternatively, various criteria, such as importance and the difference between required qualities of service (QoSs), may be used as criteria for determining the thermal margin.

Figure 2:
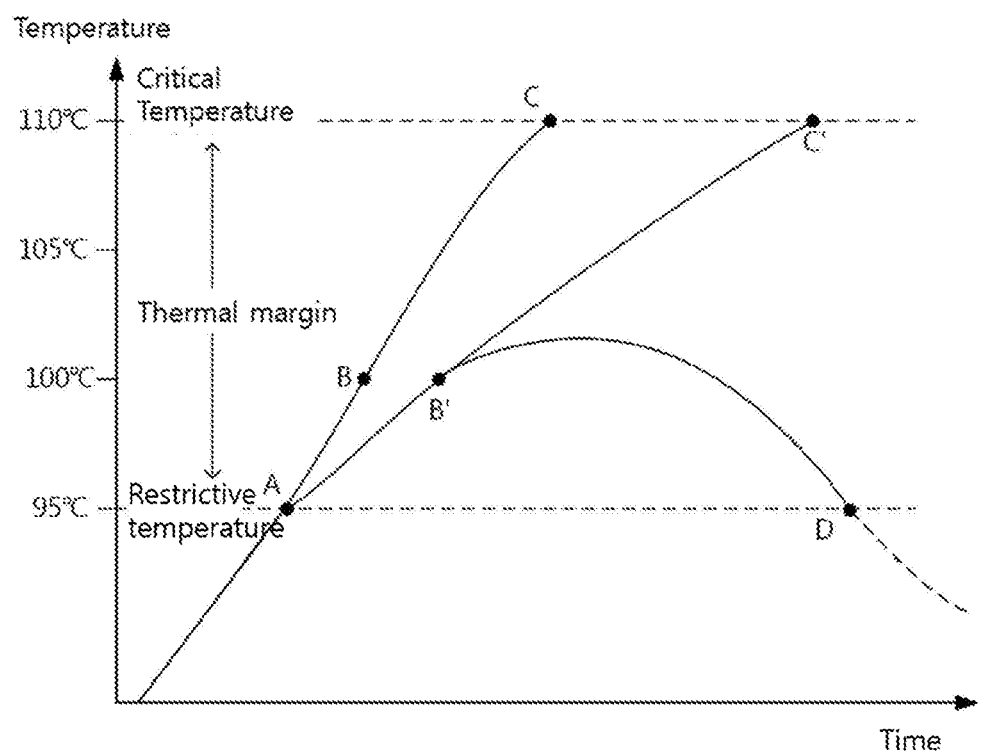
FIG. 2 is a diagram illustrating the concept of a thermal margin in the thermal management apparatus for the semiconductor processor device according to an embodiment.
Figure 3:
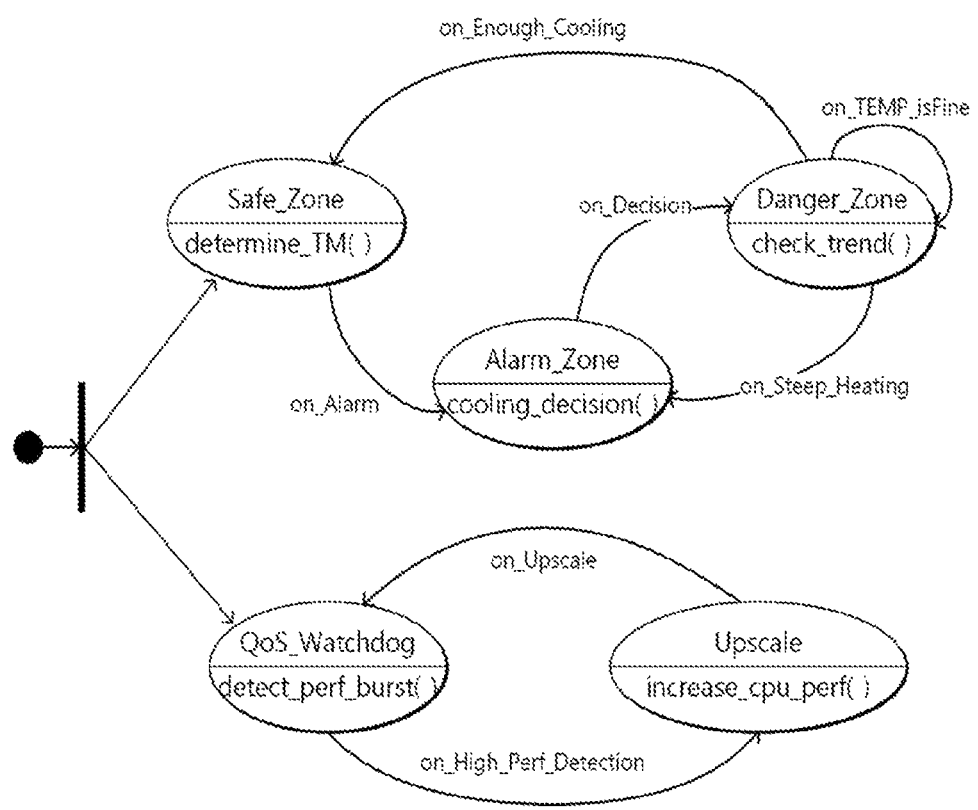
FIG. 3 is a graph illustrating an example in which a high performance burst is required for the thermal management apparatus for the semiconductor processor device according to an embodiment.

Referring to FIGS. 2 and 3, the determination of the size and state of a thermal margin is described as an example. FIG. 2 is a diagram illustrating the concept of a thermal margin which is used in the thermal management apparatus for the semiconductor processor device according to the embodiment, and FIG. 3 is a diagram illustrating a state diagram of the state of a thermal margin.

FIG. 2 schematically illustrates changes in temperature in a scenario in which a temperature rises and drops depending on operating conditions.

The critical temperature is a temperature at which the semiconductor processor device 10 does not fail immediately but the DVFS function of the processor core setting unit 12 needs to be applied in order to protect the semiconductor processor device 10 or prevent a user from being injured.

The restrictive temperature is a temperature at which operating conditions are not forced to be changed unless the current temperature passes through the restrictive temperature but a change in operating conditions needs to be taken into account when the current temperature reaches the restrictive temperature. That is, the restrictive temperature is a temperature at which the performance and the generation of heat start to be restricted.

The thermal margin in the thermal management apparatus and method according to embodiments is the distance from the critical temperature to the restrictive temperature. When the thermal margin is large, the restrictive temperature is low, so that operating conditions may be tightened even when the current temperature is low, and thus performance and the generation of heat may be limited. In contrast, when a thermal margin is small, the restrictive temperature is close to the critical temperature, and the operating conditions are maintained even when the current temperature is very high. Accordingly, the semiconductor processor device 10 needs to guarantee performance and endure the generation of heat even when a large amount of heat is generated.

When the critical temperature is 110° C. and the thermal margin is determined to be 15° C., the restrictive temperature is 95° C.

When the amount of heat generated from the processor cores 11 becomes larger than the amount of heat discharged as the load increases, thermal equilibrium is broken and the temperature starts to rise.

Since the load may be reduced and the temperature may be lowered before the temperature passes through a restrictive temperature (e.g., a point A), the operating conditions do not need to be changed.

When any measures are not taken after the temperature has passed through the restrictive temperature (i.e., the point A), the temperature may continue to rise and pass through a point B, and may reach a critical temperature at a point C.

In contrast, when any measures to ease the operating conditions are taken before the temperature passes through the point B after having passed through the point A, the rising trend of the temperature may be mitigated, and thus the temperature may reach a critical temperature at a point C' after the point C.

When measures to further ease the operating conditions are additionally taken after the temperature has passed through a point B' based on the mitigated rising trend, the temperature may change into a falling trend, and may become lower than a restrictive temperature at a point D.

The semiconductor processor device according to the embodiment determines measures to ease the operating conditions based on the thermal margin from the restrictive temperature to the critical temperature and the current temperature, not the current temperature itself. Accordingly, when the thermal margin is determined to be large, the operating conditions may be determined in such a way as to reduce the generation of heat at a relatively low temperature, for example, a restrictive temperature of 90° C. In contrast, when the thermal margin is determined to be small, the operating conditions may be determined in such a way as to reduce the generation of heat at a relatively high temperature, for example, 98° C.

As described above, in the embodiment, thermal management may be dynamically performed based on the current temperature and the thermal margin which is dynamically controlled.

Accordingly, the thermal margin state is one of a first state in which measures to reduce the generation of heat are not required because the current temperature has not reached a restrictive temperature under the current operating conditions, a second state in which measures to reduce the generation of heat need to be determined when the current temperature has reached a restrictive temperature, and a third state in which any measures are taken when the current temperature reaches a restrictive temperature and thus the current temperature is watched under changed operating conditions. In an embodiment, the first state, the second state and the third state may be referred to as a safe state, a warning state, and a danger state, respectively.

Referring back to FIG. 1, the thermal margin state determination unit 120 may determine the thermal margin state of the processor cores 11 to be one of the safe state, the warning state and the danger state depending on the current temperature, the thermal margin and whether the thermal management policy has been changed.

More specifically, when the current temperature is lower than the restrictive temperature based on the thermal margin, the thermal margin state determination unit 120 may determine that a change of thermal management policy is not required, and determine the thermal margin state to be the safe state.

In contrast, when the current temperature is higher than the restrictive temperature based on the thermal margin, the thermal margin state determination unit 120 may determine that a change of thermal management policy is immediately required, and determine the thermal margin state to be the warning state.

Assuming two examples including the same current temperature, the thermal margin state is maintained in the safe state even at a higher current temperature in an example in which the thermal margin is set to a small value than in an example in which the thermal margin is set to a high value. Accordingly, when threads having a very high priority are executed and the thermal margin is determined to be close to 0, the thermal margin state may be maintained in the safe state even when the current temperature becomes closer to the critical temperature. Accordingly, although the current temperature is very high, processors may be set to the operating conditions in which maximum performance continues to be achieved.

In contrast, when threads having a lower priority are executed, the size of the thermal margin may become relatively large. When the thermal margin becomes large, the restrictive temperature is lowered, the thermal margin state switches to the warning state even at a lower temperature, and measures to reduce the generation of heat are performed. Accordingly, when only threads having a low priority are executed, the thermal margin state may enter the warning state even when the current temperature is far lower than the critical temperature. Accordingly, the processors may be set to the operating conditions in which the generation of heat is decreased even when the current temperature is low.

After measures to reduce the generation of heat have been taken, the semiconductor processor device 10 may watch a change in temperature for some time. In this case, the thermal margin state determination unit 120 may determine the thermal margin state to be the danger state. The thermal margin state determination unit 120 may switch to the warning state in order to determine a more positive thermal management policy, may maintain the danger state that requires an additional watch while maintaining the current thermal management policy, or may switch to the safe state because the current measures are no longer required and the current operating conditions may safely return to the previous operating conditions, based on the result of the watching of the danger state.

Referring to FIG. 3, the switching of a thermal margin state is illustrated. The initial thermal margin state is a safe state "Safe_Zone."

While the thermal margin state is the safe state, a thermal margin is determined, and a restrictive temperature based on the determined thermal margin is compared with the current temperature.

When the current temperature is equal to or lower than the restrictive temperature, the thermal margin state may be maintained in the safe state.

In contrast, when the current temperature exceeds the restrictive temperature when the thermal margin state is the safe state, the thermal margin state may switch from the safe state to a warning state "Alarm_Zone."

When the thermal margin state is the warning state, a thermal management policy is appropriately determined.

When the policy determination unit 130 newly determines a thermal management policy, the thermal margin state switches to a danger state "Danger_Zone."

When the thermal margin state is the danger state, a change in current temperature is watched.

When the current temperature exceeds a secondary restrictive temperature as a result of the watching of the current temperature in the danger state, the thermal margin state returns to the warning state in order to change the thermal management policy.

In contrast, when the current temperature is equal to or lower than a return temperature based on a thermal margin, the thermal margin state may switch to the safe state.

When the current temperature is higher than the restrictive temperature but is equal to or lower than the secondary restrictive temperature, the thermal margin state may be maintained in the danger state and a change in current temperature may be watched.

The restrictive temperature based on which a switch from the safe state to the warning state is determined, the secondary restrictive temperature based on which a switch from the danger state to the warning state is determined and the return temperature based on which a switch from the danger state to the safe state is determined may be set differently or identically depending on the intention of a designer. In an embodiment, the restrictive temperature may be determined at least based on the thermal margin. The secondary restrictive temperature or the return temperature may be determined based on the thermal margin or the restrictive temperature.

In an embodiment, the thermal margin may be determined based on the priority of threads and the load of the processor cores 11.

For example, the thermal margin may be relatively increased or decreased based on the priority of a thread which is the highest of all the priorities of threads.

More specifically, as the priority of a thread which is the highest of all the priorities of threads becomes higher, the thermal margin may be reduced and the restrictive temperature may become higher. In contrast, as the priority of a thread which is the highest of all the priorities of threads becomes lower, the thermal margin may be increased and the restrictive temperature may become lower.

For example, the priorities may be classified into "real-time", "very high", "high", "normal", "low," and "very low." When the priority of a thread which is the highest of all the priorities of threads being executed is "very high", the thermal margin may become very small and the restrictive temperature may become close to the critical temperature. Assuming two examples including the same current temperature, the thermal margin state is maintained in the safe state and does not switch to the warning state even at a higher current temperature in an example in which a restrictive temperature is set to a high value based on a small thermal margin than in an example in which the restrictive temperature is set to a low value based on a large thermal margin. Accordingly, when a thread having a very high priority is executed, the thermal margin state may be maintained in the safe state due to the higher restrictive temperature even when the current temperature becomes close to the critical temperature. Accordingly, processors may be set to the operating conditions in which maximum performance continues to be achieved even when the current temperature is high. Furthermore, although the current temperature becomes extremely high, the thermal margin state switches to the warning state or the danger state and measures to reduce the generation of heat are taken, the thermal margin state directly switches to the safe state due to a high return temperature, and thus maximum performance may be achieved. Accordingly, when a thread having a high priority is executed, the maximum performance of processors can be guaranteed.

In contrast, when the priority of a thread which is the highest of all the priorities of threads being executed is, for example, "low", the thermal margin may be set to a high value and the restrictive temperature may be lowered close to room temperature. In two examples including the same current temperature, when the thermal margin increases, the restrictive temperature is exceeded even at a lower current temperature, so that the thermal margin state switches to the warning state and measures to reduce the generation of heat are taken. Accordingly, while only threads having a low priority are executed, the thermal margin state may enter the warning state even when the current temperature is far lower than the critical temperature, and thus the processors may be set to the operating conditions in which the generation of heat is decreased even when the current temperature is low. Furthermore, when the return temperature is set to a low value, the thermal margin state does not switch to the safe state easily even when the current temperature is further lowered, and thus the operating conditions in which the generation of heat is decreased may continue. Accordingly, the temperature of the processors may be lowered as far as possible in preparation for the subsequent execution of a thread having a high priority. Accordingly, when a thread having a high priority is subsequently executed, maximum performance can be guaranteed.

Referring back to FIG. 1, the policy determination unit 130 may determine a thermal management policy regarding the processor cores 11 based on the thermal margin state.

In an embodiment, the policy determination unit 130 may determine a new thermal management policy while the thermal margin state determined by the thermal margin state determination unit 120 is being in the warning state. In particular, the policy determination unit 130 may determine a new thermal management policy so that the current temperature does not exceed a secondary restrictive temperature or the current temperature becomes lower than a return temperature.

Accordingly, the processor core setting unit 12 may control the activation, voltage and frequency of the processor cores in compliance with a thermal management policy determined by the policy determination unit 130.

Meanwhile, the thermal management policy chiefly employs a hardware approach, such as the activation/deactivation and voltage and frequency setting of the processor cores. In contrast, in a thermal management scheme according to an embodiment, a software approach for performing control based on the priorities of threads constituting the load may be employed.

Accordingly, the scheduler 140 may classify threads being executed on the processor cores 11 into priority threads, such as foreground threads, and non-priority threads, such as background threads.

For example, the priority threads are threads directly related to user experience and may be illustrated as being threads for generating a screen of a mobile device and processing a user instruction for a mobile device or displaying the results of processing to a user. In contrast, for example, the non-priority threads are threads which are not directly related to user experience or are executed for priority threads.

When processor core settings are controlled and thus performance is decreased, experienced performance may be significantly deteriorated when the priority threads are not appropriately processed, but experienced performance is not highly influenced even when the non-priority threads are not processed just in time.

Accordingly, the scheduler 140 may control time slices allocated to the non-priority threads in compliance with a thermal management policy.

When the thermal management policy becomes strict, the processing capabilities of the processor cores 11 are reduced because the generation of heat decreased by reducing speed and voltage. The scheduler 140 increases the CPU share of priority threads, but instead decreases the occupation of the CPU of the non-priority threads so that user-experienced performance is not influenced despite the reduced processing capabilities.

Accordingly the scheduler 140 may operate so that it allocates less time slices to the non-priority threads and allocates more time slices to the priority threads.

Furthermore, when the threads are classified into the priority threads and the non-priority threads, the current load, i.e., one of variables constituting a thermal model, is a load related to the processing of the priority threads of threads that are executed on the processor cores 11.

Meanwhile, there may be cases where even when processor core settings are controlled and thus overall performance decreased, threads may sometimes request high performance from the processor cores. For example, when threads for displaying the results of processing to a user within a specific limited time are temporarily executed only until the limited time expires, the thermal management scheme according to the embodiment may temporarily perform high performance burst for such threads.

Figure 4:
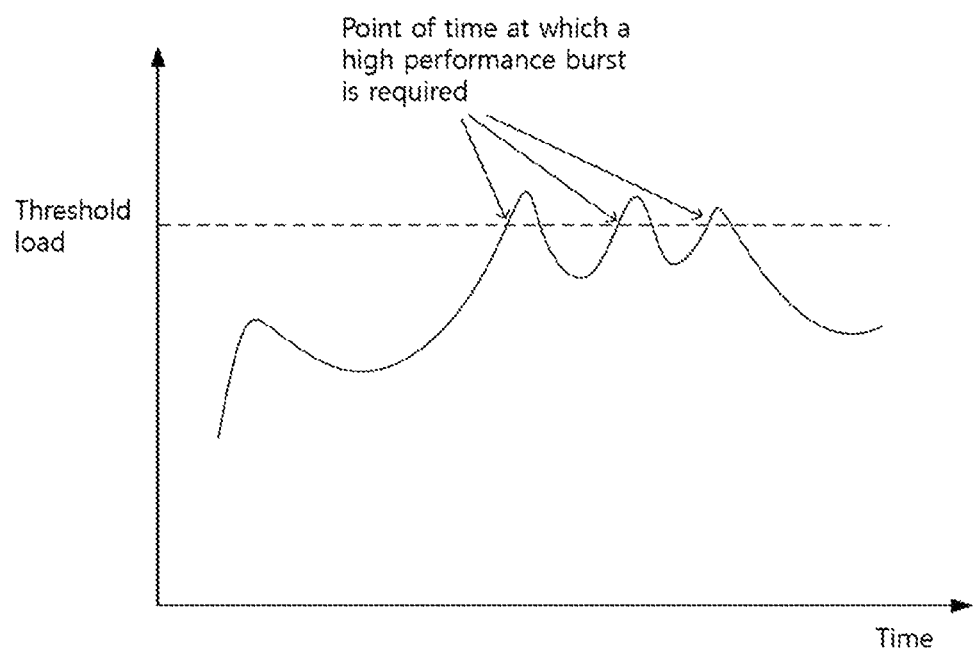
FIG. 4 is a graph illustrating a state in which the temperature of the semiconductor processor device is managed while a thermal margin state and a performance state equally have an influence on a thermal management policy in the thermal management apparatus for the semiconductor processor device according to an embodiment.

Reference is made to FIG. 4 in order to illustrate such a high performance burst state. FIG. 4 is a graph illustrating an example in which high performance burst is temporarily required for the thermal management apparatus for the semiconductor processor device according to the embodiment.

In FIG. 4, from the load graph of the processor cores 11 under specific operating conditions in which medium performance is achieved, it may be seen that a load temporarily has several peaks. The case where a load temporarily exceeds a specific threshold load in the state in which performance has been reduced for thermal management may be considered to be a situation in which high performance burst is temporarily required.

In general, a conventional on-demand power management governor maximizes the performance of a processor when performance above processing capability is required.

In contrast, the thermal management scheme according to the embodiment deals with a situation in which high performance burst is required in such a way as to determine the performance state of processors based on the load of threads when the situation occurs.

In this context, in FIG. 1, the performance state determination unit 150 may determine a performance state based on the load of threads, and may generate a high performance burst request when the determined performance state is a high-performance requiring state.

In an embodiment, the performance state determination unit 150 may determine a performance state by comparing a load, related to the priority threads of threads being executed on the processor cores, with a threshold load, and may generate a high performance burst request when the determined performance state is a high-performance requiring state in which the load related to the priority threads exceeds a threshold load.

Furthermore, when the high performance burst request is received from the performance state determination unit 150, the policy determination unit 130 may select a processor core setting that belongs to a plurality of processor core settings and that provides performance higher than that of the current processor core setting, and may determine a thermal management policy based on the selected processor core setting.

The operations of the performance state determination unit 150 and the policy determination unit 130 are also illustrated in the state diagram of FIG. 3.

In FIG. 3, the performance state determined by the performance state determination unit 150 may influence the thermal management policy of the policy determination unit 130 in the same manner as the thermal margin state determined by the thermal margin state determination unit 120.

For this purpose, the performance state may switch between a performance watch state and a high-performance requiring state.

When an initial load is at a normal level, the performance state is the performance watch state (QoS_Watchdog).

While the performance state is being in the performance watch state, a detect_perf_burst( ) function of detecting whether high performance burst is required while continuing to watch the load of the processor cores 11 is executed.

When the load, particularly the load of priority threads, exceeds a specific threshold load and a situation in which high performance burst is required is detected (on_High_Perf_Detection), the performance state switches to the high-performance requiring state (Upscale).

When the performance state switches to the high-performance requiring state, an increase_cpu_perf( ) function of generating a high performance burst request for the policy determination unit 130 is executed, and the performance state directly (on_Upscale) switches to the performance watch state.

When the load still exceeds the threshold load even after performance has been accelerated, the performance state switches to the high-performance requiring state again and the operations of generating a high performance burst request again may be repeated.

Figure 5:
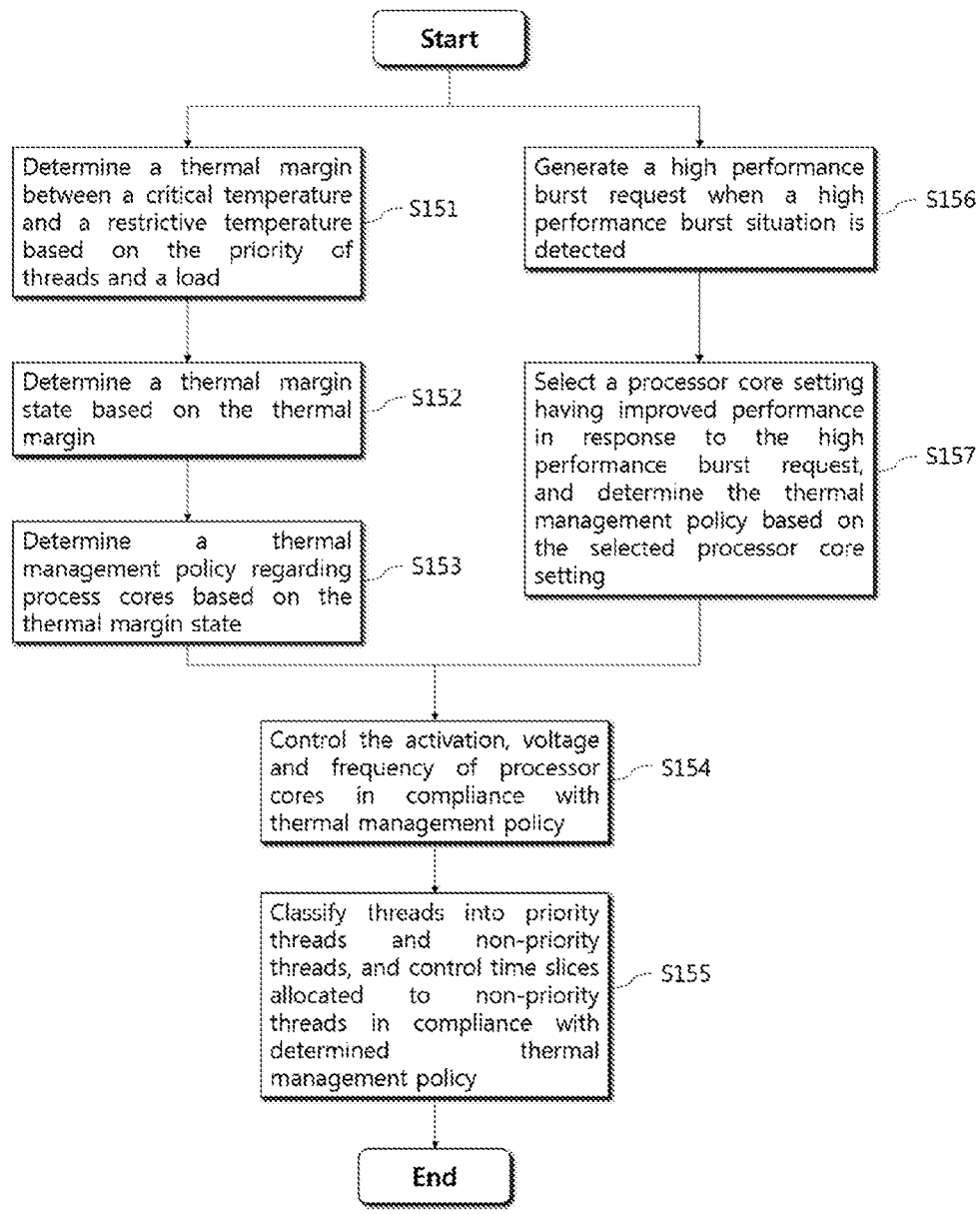
FIG. 5 is a flowchart illustrating a thermal management method for the semiconductor processor device according to an embodiment.

FIG. 5 is a flowchart illustrating a thermal management method for the semiconductor processor device according to an embodiment.

Referring to FIG. 5, in the thermal management method for the semiconductor processor device including one or more processor cores according to the embodiment, the semiconductor processor device 10 may determine a thermal margin based on at least one of the load of the processor cores 11 and the priority of threads being executed on the processor cores 11 at step S151.

In an embodiment, the thermal margin may be determined to be small as the priority of threads becomes higher. Accordingly, the restrictive temperature may be determined to be high.

In an embodiment, the thermal margin may be determined to be small as the load of the processor cores 11 becomes high. Accordingly, the restrictive temperature may be determined to be high.

More specifically, the thermal margin may be determined to be small as the weighted sum of the priorities of threads and the loads of the processor cores 11 is increased. Accordingly, the restrictive temperature may be determined to be high.

At step S152, the semiconductor processor device 10 may determine a thermal margin state based on the thermal margin and the current temperature.

In an embodiment, step S152 of determining the thermal margin state may include the step of determining the thermal margin state of the processor cores 11 to be one of a safe state, a warning state and a danger state based on the result of comparison between the current temperature and a restrictive temperature based on the thermal margin and whether a thermal management policy has been changed. In this case, the restrictive temperature is lower than a critical temperature by the thermal margin.

More specifically, step S152 of determining the thermal margin state may include the step of maintaining the thermal margin state in the safe state when the restrictive temperature based on the thermal margin is lower than the current temperature while the thermal margin state is being in the safe state, and the step of switching the thermal margin state from the safe state to the warning state when the restrictive temperature based on the thermal margin is higher than the current temperature while the thermal margin state is being in the safe state.

Furthermore, step S152 of determining the thermal margin state may include the step of switching the thermal margin state to the danger state when the thermal management policy is determined while the thermal margin state is being in the warning state.

Furthermore, step S152 of determining the thermal margin state may include the step of switching the thermal margin state to the warning state when the current temperature is higher than the secondary restrictive temperature while the thermal margin state is being in the danger state, maintaining the thermal margin state in the danger state when the current temperature is lower than the secondary restrictive temperature but is higher than a return temperature, and switching the thermal margin state in the safe state when the current temperature is lower than the return temperature. In an embodiment, the secondary restrictive temperature may be set to a value equal to or higher than the restrictive temperature. In an embodiment, the return temperature may be set to a value equal to or lower than the restrictive temperature.

At step S153, the semiconductor processor device 10 may determine a thermal management policy regarding the processor cores based on the thermal margin state.

More specifically, step S153 of determining the thermal management policy may include the step of determining the thermal management policy so that the semiconductor processor device 10 reduces the amount of heat generated, more specifically so that the current temperature becomes lower than the secondary restrictive temperature or the return temperature while the thermal margin state is the warning state.

At step S154, the semiconductor processor device 10 may control the activation, voltage and frequency of the processor cores based on the determined thermal management policy.

In an embodiment, the thermal management method for the semiconductor processor device may further include step S155 so that user experienced performance may be maintained using software.

At step S155, the semiconductor processor device 10 may operate to classify threads being executed on the processor cores into priority threads and non-priority threads and to control time slices allocated to the non-priority threads in compliance with the determined thermal management policy.

In this case, the current load may be a load related to the processing of the priority threads of the threads being executed on the processor cores.

In an embodiment, the thermal management method for the semiconductor processor device may further include steps S156 and S157 so that performance is improved in order to maintain experienced performance for a user, when required.

At step S156, the semiconductor processor device 10 may watch the occurrence of a high performance burst situation in which the load related to the priority threads of the threads being executed on the processor cores 11 exceeds a threshold load, and may generate a high performance burst request when the high performance burst situation is detected.

Furthermore, at step S157, the semiconductor processor device 10 may select a processor core setting, which provides higher performance than the current performance, from among a plurality of processor core settings in response to the high performance burst request, and may determine a thermal management policy based on the selected processor core setting.

Figure 6:
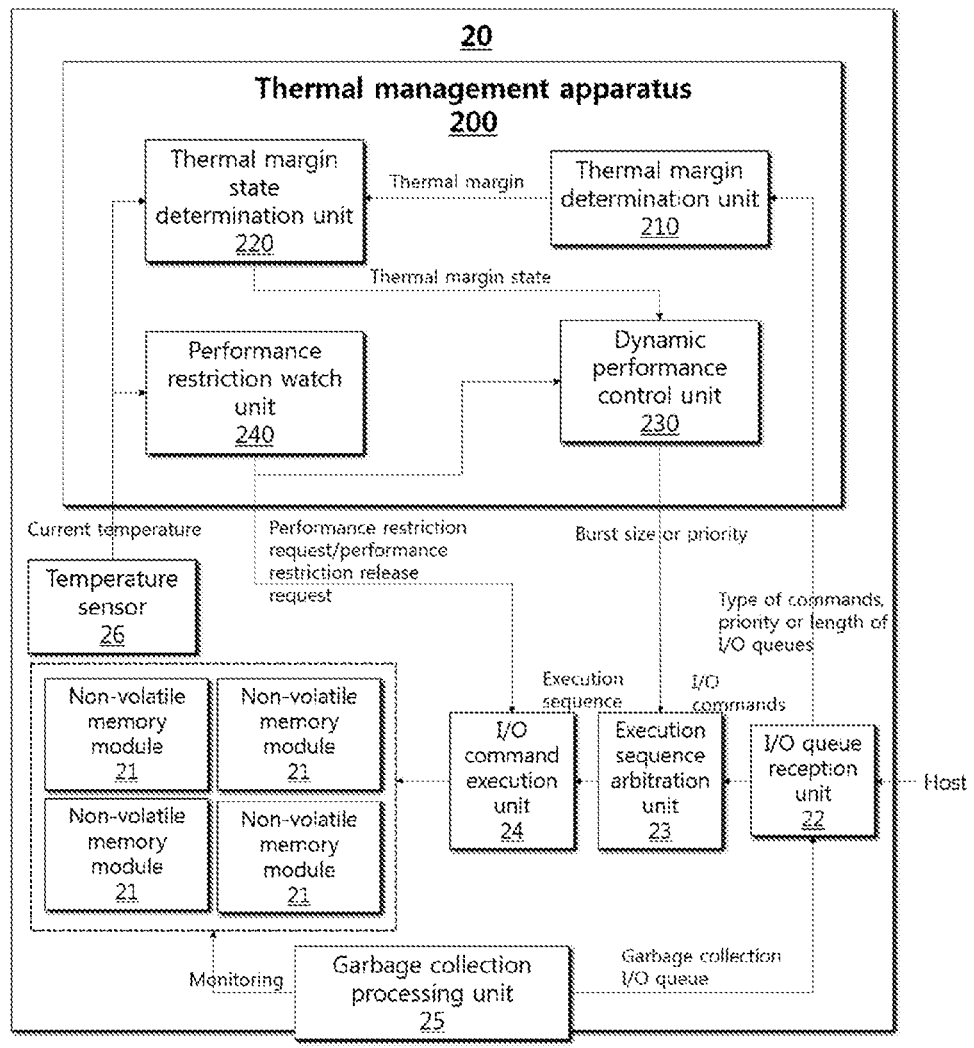
FIG. 6 is a block diagram illustrating a thermal management apparatus capable of dynamically managing the generation of heat, and a non-volatile data storage device including the thermal management apparatus according to an embodiment.

FIG. 6 is a block diagram illustrating a thermal management apparatus capable of dynamically managing the generation of heat and a non-volatile data storage device including the thermal management apparatus according to an embodiment.

Referring to FIG. 6, the non-volatile data storage device 20 may include one or more non-volatile memory modules 21, an I/O queue reception unit 22, an execution sequence arbitration unit 23, an I/O command execution unit 24, a garbage collection processing unit 25, a temperature sensor 26, and a thermal management apparatus 100.

In an embodiment, the thermal management apparatus 200 may be implemented as part of the non-volatile data storage device 20, may be implemented independently of the non-volatile data storage device 20, or may be implemented within a host.

The one or more non-volatile memory modules 21 are thermally independent of each other in terms of hardware, and may be individually subjected to thermal management. Accordingly, although any one non-volatile memory module 21 is excessively heated, other non-volatile memory modules 21 may be in a normal operating range.

The host does not distinguish the one or more non-volatile memory modules 21 from each other, and recognizes them as a single large storage device. The single large storage device may have at least one logical storage space. In the NVMe standard, such a logical storage space is called a namespace. The namespace is uniquely identified by a namespace ID. The NVMe standard supports dynamic connection between a plurality of the hosts and a plurality of the non-volatile data storage devices within a single system.

Accordingly, namespace IDs are assigned so that they are uniquely identified among at least a plurality of arbitrary hosts so that the plurality of hosts may access the same logical storage space, and are shared between the hosts. Accordingly, even when any host is connected or the connection of any host is released, software executed on a host may access a specific namespace. Furthermore, the namespace is a logical storage space. Accordingly, any hosts may access data within the namespace regardless of a physical change, such as the replacement of hardware for storing actual data for maintenance or the movement of a location, where actual data is stored, attributable to the execution of garbage collection, even when the physical change occurs.

A controller management module for controlling the non-volatile storage devices and individual cores on the host side may generate I/O queues for the non-volatile storage devices.

Such an I/O queue may include, for example, read, program or flush commands for a specific namespace or I/O commands for the control of other various operations. The I/O queue is generated by the processor core of the host when a single thread or a single application requests data access. When a single core executes several threads, several I/O queues may be generated. I/O queue IDs are uniquely assigned to the I/O queues so that all the hosts and all the non-volatile storage devices within a corresponding system are uniquely identified.

Each of the I/O queues includes a plurality of contiguous elements each having a fixed size. I/O commands may be mounted on the respective elements. The I/O queue starts with an element pointed by a head pointer, and ends at an element pointed by a tail pointer. When the I/O queue has not been saturated up to a maximum length, a new I/O command may be mounted on an element subsequent to the element pointed by the tail pointer.

The host may assign a specific priority to the I/O queue. For example, priorities, such as "urgent", "high", "medium," and "low," may be assigned. For example, a manager I/O queue generated by the controller management module may have the "urgent" priority. An I/O queue generated in response to the I/O request of a thread having a high priority may have the "high" priority.

The NVMe standard supports a maximum of 65,000 I/O queues. A maximum of 64 K I/O commands may be mounted on each of the I/O queue.

The host sends each of the I/O queues from a processor core to the non-volatile memory storage device 20 over, for example, a PCI-e bus.

The I/O queue reception unit 22 of the non-volatile memory storage device 20 may receive one or more I/O queues, including I/O commands regarding one or more logical storage spaces, from one or more hosts.

The execution sequence arbitration unit 23 may arbitrate an execution sequence in connection with I/O commands that form I/O queues.

The execution sequence arbitration unit 23 may arbitrate the execution sequence of I/O commands according to an arbitration scheme, such as round robin or weighted round robin.

The execution sequence may be influenced by a burst size or a priority.

For example, the burst size is the length of I/O commands that are continuously processed at one time. In the NVMe standard, the burst size may be designated as $2^n$, for example, one value of 1, 2, 4, . . . , 64 and an unlimited value.

The execution sequence of the I/O commands may be determined for each memory bank, i.e., a unit that may be simultaneously accessed in terms of hardware.

The I/O command execution unit 24 may execute I/O commands on the non-volatile memory modules 21 according to an arbitrated execution sequence for each memory bank.

For the read command of the I/O commands, a logical storage space in which data, i.e., the target of a read command, has been stored has already been determined. Accordingly, a non-volatile memory module corresponding to the logical storage space is determined regardless of temperature.

In contrast, for the program command or flush command of the I/O commands and/or other commands that cause a program operation, the program operation needs to be performed or may be performed in an empty space. For example, in a non-volatile memory module to which random access is impossible, a program operation needs to be performed in an empty space. In a non-volatile memory module to which random access is possible, a program operation may be performed in such a way as to overwrite data in the location where existing data has been stored or in such a way as to newly write data in an empty space.

Accordingly, when an I/O queue includes a program command or flush command issued by the host, a non-volatile memory module on which a program operation is to be performed in response to the program command or flush command may be preferentially selected from among non-volatile memory modules having a relatively low current temperature.

The non-volatile memory storage device 20 may frequently perform garbage collection as desired. For this purpose, the garbage collection processing unit 25 may monitor non-volatile memory modules, requiring garbage collection, among the non-volatile memory modules 21 and non-volatile memory modules, having free spaces, among the non-volatile memory modules 21.

In an embodiment, the garbage collection processing unit 25 may search for a page that does not have an access request and that has been severely segmented, and may independently perform garbage collection on an appropriate empty page.

In an embodiment, when garbage collection is determined to be required, the garbage collection processing unit 25 may treat garbage collection in the same manner as other I/O queues are treated by generating a garbage collection I/O queue including I/O commands related to the processing of the garbage collection and having a specific priority and adding the garbage collection I/O queue among I/O queues received by the I/O queue reception unit 21.

In the above embodiment, the garbage collection may be appropriately processed according to a dynamic thermal management scheme.

Furthermore, the non-volatile memory module accessed in connection with the garbage collection I/O queue may be preferentially selected from among non-volatile memory modules having a relatively low current temperature because the garbage collection I/O queue includes a program command based on the garbage collection.

As described above, a high-performance non-volatile memory interface, such as that of the NVMe standard, needs to actively deal with the generation of heat because the non-volatile memory modules 21 request a large amount of data to be processed at high speed.

The NVMe standard defines only measures to set a threshold temperature or a critical temperature by which whether a temperature detected by the temperature sensors 16 for all the non-volatile memory storage devices 20 is in the danger state, to reduce or stop the overall hardware performance of the non-volatile memory storage devices 20 when the detected temperature exceeds the critical temperature or the critical temperature, and to report the generation of an asynchronous event.

In contrast, in an embodiment, the execution of I/O commands, i.e., the causes of the generation of heat, may be temporally and spatially distributed by dynamically forcing a restriction onto performance based on the importance of each I/O queue instead of collectively limiting the performance of all the non-volatile memory storage devices 20. Furthermore, in an embodiment, when the generation of heat becomes severe despite the distribution of the causes of the generation of heat, maximum experienced performance can be maintained by executing some I/O commands, selected based on the importance of I/O commands, instead of collectively stopping the operation of all the non-volatile memory storage devices 20.

For this purpose, the thermal management apparatus 200 according to the embodiment may include a thermal margin determination unit 210, a thermal margin state determination unit 220, a dynamic performance control unit 230, and a performance restriction watch unit 240 in order to secure performance despite a dynamic change in the temperature of the non-volatile memory modules 21.

The thermal margin determination unit 210 may determine the thermal margin of each of the I/O queues, received by the I/O queue reception unit 21, based on any one of a priority assigned to each I/O queue, the type of I/O command and the length of each I/O queue.

The thermal margin may be defined as a difference between a critical temperature adapted to protect the non-volatile memory modules and a restrictive temperature adapted to cause the switching of thermal margin state.

The thermal margin state may be determined to be a normal state in which the current temperature is lower than the restrictive temperature, or a restriction state in which the current temperature is higher than the restrictive temperature.

Figure 7:
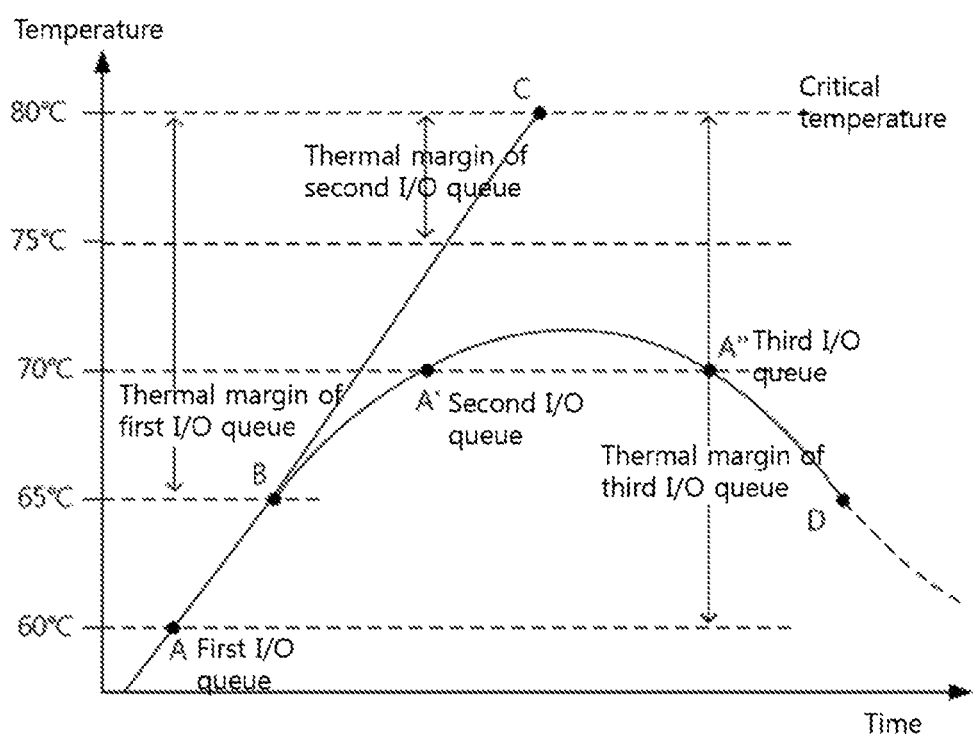
FIG. 7 is a diagram illustrating the concept of a thermal margin in a non-volatile data storage device capable of dynamically managing the generation of heat according to an embodiment.

FIG. 7 is a diagram illustrating the concept of a thermal margin in a non-volatile data storage device capable of dynamically managing the generation of heat according to an embodiment.

FIG. 7 schematically illustrates changes in temperature in a scenario in which a temperature rises and drops in response to the execution of I/O commands.

A critical temperature is a temperate at which a non-volatile memory module 21 does not immediately fails but a power management function may be actively applied in order to protect the non-volatile memory module 21 or to prevent a user from being injured.

A restrictive temperature is a temperature at which the power management function is not forced to be applied unless the current temperature passes through the restrictive temperature but the power management function needs to be considered when the current temperature reaches the restrictive temperature. That is, the restrictive temperature is a temperature at which performance starts to be limited in order to prevent the generation of heat.

In general, the restrictive temperature is assigned to overall hardware. However, in embodiments, different restrictive temperatures may be set for respective I/O queues.

In the thermal management apparatus and method according to the embodiments, the thermal margin is the distance from the critical temperature to the restrictive temperature.

When the critical temperature of a specific non-volatile memory module 21 is 80° C. and the thermal margin of a first I/O queue received at a point A is determined to be 15° C., the restrictive temperature of the first I/O queue is 65° C. When the current temperature is 60° C. at the point A, the first I/O queue may be executed.

When the amount of heat generated from the non-volatile memory module 21 is larger than the amount of heat discharged as the first I/O queue is executed, thermal equilibrium is broken and a temperature starts to rise.

The execution of the first I/O queue may not be limited because a rising temperature may be lowered as long as the first I/O queue is terminated before the temperature passes through a restrictive temperature.

When the execution of the first I/O queue is not limited after the temperature has risen and thus the current temperature has reached the restrictive temperature (at a point B), the temperature may continue to rise and reach a critical temperature at a point C.

In contrast, if any measures to limit the execution of the first I/O queue are taken when the temperature passes through the point B, the rising trend of the temperature may be reduced and may be changed into a falling trend, and thus the temperature may become lower than the restrictive temperature again at a point D.

The non-volatile memory storage device according to the embodiment determines execution restriction measures based on the current temperature and a thermal margin from a restrictive temperature, which is different for each I/O queue, to a critical temperature, not the current temperature itself. Accordingly, when the thermal margin is determined to be large, the execution of an I/O queue may be limited so that the generation of heat decreased even at the current temperature which is a relatively low temperature, for example, 60° C. When the thermal margin is determined to be small, the execution of the I/O queue may be guaranteed despite the generation of heat when a relatively high temperature, for example, 80° C., is reached.

As described above, in an embodiment, thermal management can be dynamically performed based on the current temperature and the thermal margin that is dynamically controlled for each I/O queue.

For example, when a second I/O queue having a high priority of "urgent" or "high" is received at a point A,' the thermal margin of the second I/O queue may be determined to be relatively small, for example, 5° C. Accordingly, the execution of such a second I/O queue may be guaranteed because the current temperature is lower than a restrictive temperature of 75° C. based on the thermal margin even when the current temperature (the point A') of the non-volatile memory module 21 is 70° C.

In contrast, the thermal margin of a third I/O queue which is received at a point A" and has a priority of "normal" may be determined to be relatively large, for example, 20° C. Accordingly, when the current temperature (the point A") of a non-volatile memory module 21 to be accessed by the third I/O queue is 70° C. identical to the temperature in the above case, the execution of the third I/O queue may be limited because the current temperature is higher than a restrictive temperature of 60° C. based on the thermal margin.

As described above, in the embodiments, accesses to all I/O queues are not collectively controlled based on the current temperature of a corresponding non-volatile memory module 21, but may be selectively controlled based on the current temperature and a thermal margin that is different for each I/O queue.

Referring back to FIG. 6, more specifically, the thermal margin determination unit 210 may determine the size of the thermal margin of a corresponding I/O queue to be smaller as the priority of the corresponding I/O queue increases has a higher priority. Accordingly, the thermal margin determination unit 210 may set the restrictive temperature of the corresponding I/O queue to a higher value.

In an embodiment, the thermal margin determination unit 210 may determine the size of the thermal margin of a corresponding I/O queue to be smaller as the corresponding I/O queue has a shorter length. Accordingly, the thermal margin determination unit 210 may set the restrictive temperature of the corresponding I/O queue to a higher value. When the length of an I/O queue is short, a relatively small amount of heat may be generated. Accordingly, the I/O commands of the I/O queue may be executed.

For example, when a critical temperature is 80° C., the thermal margin of an I/O queue having a short length corresponding to only 100 elements may be determined to be relatively small, for example, 5° C. Accordingly, although the current temperature of a non-volatile memory module 21 to be accessed by the short I/O queue is 70° C., the execution of the I/O queue may be guaranteed because the current temperature is lower than a restrictive temperature of 75° C. based on the thermal margin.

In contrast, the thermal margin of an I/O queue having a long length corresponding to 10,000 elements may be determined to be relatively large, for example, 20° C. Accordingly, when the current temperature of a non-volatile memory module 21 to be accessed by such a long I/O queue is 70° C. identical to the temperature in the above case, the execution of the I/O queue may be limited because the current temperature is higher than a restrictive temperature of 60° C. based on the thermal margin.

In another embodiment, the thermal margin determination unit 210 may determine the size of the thermal margin of a corresponding I/O queue to be smaller as the weighted sum of the length of the corresponding I/O queue and a value (the lower the value, the higher the priority) obtained by digitizing the priority of the corresponding I/O queue decreases. Accordingly, the thermal margin determination unit 210 may set the restrictive temperature of the corresponding I/O queue to a higher value.

In another embodiment, the thermal margin determination unit 210 may determine the size of a thermal margin to be small when an I/O command included in an I/O queue is a read command, and thus may set the restrictive temperature of the corresponding I/O queue to a high value.

For example, assuming that a critical temperature is 80° C., when an I/O queue includes only read commands, the thermal margin of the I/O queue may be determined to be relatively small, for example, 5° C. Accordingly, the execution of the read commands of the I/O queue may be guaranteed because the current temperature is lower than a restrictive temperature of 75° C. based on the thermal margin even when the current temperature of a non-volatile memory module 21 to be read by the I/O queue is 70° C. because the read commands generate a relatively small amount of heat.

In contrast, when I/O commands included in an I/O queue are program commands or flush commands from a host or include I/O commands for the processing of garbage collection, the thermal margin determination unit 210 may determine the size of the thermal margin to be large. Accordingly, the thermal margin determination unit 210 may set the restrictive temperature of the corresponding I/O queue to a low value.

For example, when an I/O queue includes a plurality of program commands, the thermal margin of the I/O queue may be determined to be relatively large, for example, 20° C. Accordingly, when the current temperature of the non-volatile memory module 21 to be programmed by the I/O queue is 70° C. identical to the temperature in the above case, the execution of the program commands of the I/O queue may be limited because the program commands cause a relatively large amount of heat and the current temperature is higher than a restrictive temperature of 60° C. based on the thermal margin.

The thermal margin state determination unit 220 may determine the thermal margin state of an I/O queue based on the current temperature and thermal margin of a non-volatile memory module that is selected for the I/O queues from among the non-volatile memory modules 21.

For example, the thermal margin state may be determined to be a normal state in which the current temperature is lower than a restrictive temperature, or a restriction state in which the current temperature is higher than a restrictive temperature.

In various embodiments, the dynamic performance control unit 230 may control the overall execution speed of I/O commands.

In an embodiment, the dynamic performance control unit 230 may control an execution speed by maintaining or extending the burst size of I/O commands belonging to an I/O queue whose thermal margin state is the normal state and reducing the burst size of I/O commands belonging to an I/O queue whose thermal margin state is the restriction state.

For example, when the dynamic performance control unit 230 sets the burst size to an unlimited value for a first I/O queue whose thermal margin state is determined to be the normal state based on a high priority or a short length, the first I/O queue may be rapidly processed despite a high temperature because the execution sequence arbitration unit 23 incorporates all I/O commands, constituting the first I/O queue, into an execution sequence without limitation to length.

In contrast, when the dynamic performance control unit 230 sets the burst size to a short value, for example, 16 for a second I/O queue whose thermal margin state is determined to be the restriction state based on a low priority or a long length, the execution sequence arbitration unit 23 may incorporate I/O commands, constituting the second I/O queue, into an execution sequence. Accordingly, the second I/O queue may be slowly processed due to a high temperature, and the generation of heat may be limited.

In an embodiment, the dynamic performance control unit 230 may set priorities of I/O queues again so that I/O commands belonging to an I/O queue whose thermal margin state is the normal state have priority over I/O commands belonging to an I/O queue whose thermal margin state is the restriction state.

For example, when the thermal margin state of the first I/O one of the first and second I/O queues having the same priority of "normal" is the normal state and the thermal margin state of the second I/O queue is the restriction state, the dynamic performance control unit 130 may set the priority of the first I/O queue to "high" and set the priority of the second I/O queue to "low" again.

Accordingly, the execution sequence arbitration unit 23 may incorporate the I/O commands of the first I/O queue, having the increased priority, into an execution sequence with higher frequency and incorporate the I/O commands of the second I/O queue, having the lowered priority, into an execution sequence with lesser frequency according to the weighted round robin arbitration scheme. The first I/O queue may be rapidly processed despite a high temperature, the second I/O queue may be slowly processed due to a high temperature, and the generation of heat may be limited.

The performance restriction watch unit 240 may watch the occurrence of a danger temperature situation in which the current temperature of the non-volatile memory modules 21 detected by the temperature sensors 26 exceeds the critical temperature or the critical temperature.

The performance restriction watch unit 240 may generate a performance restriction request for the non-volatile memory module 11 in which the danger temperature situation has occurred, or may generate a performance restriction release request for the non-volatile memory module 11 whose danger temperature situation has been terminated.

In this case, when the performance restriction request is received from the performance restriction watch unit 240, the I/O command execution unit 24 may delay the execution of I/O commands regarding a non-volatile memory module 21 in which the danger temperature situation has occurred or regarding all the non-volatile memory modules 21. When the performance restriction release request is received, the I/O command execution unit 24 may resume the execution of the I/O commands.

In an embodiment, the execution sequence arbitration unit 24 may respond to the performance restriction request. In this case, when a performance restriction request is received from the performance restriction watch unit 240, the execution sequence arbitration unit 24 may delay the arbitration of the execution sequence of I/O commands regarding a non-volatile memory module 21 in which a danger temperature situation has occurred or regarding all the non-volatile memory modules 21. When the performance restriction release request is received, the execution sequence arbitration unit 24 may resume the arbitration of the execution sequence.

In an embodiment, the dynamic performance control unit 230 may respond to the performance restriction request. In this case, when the performance restriction request is received from the performance restriction watch unit 240, the dynamic performance control unit 230 may minimize the burst size of I/O queues regarding a non-volatile memory module 21 in which a danger temperature situation has occurred or regarding all the non-volatile memory modules 21, or may set the priority of all the I/O queues, exclusive of a manager I/O queue, to a minimum value.

Figure 8:
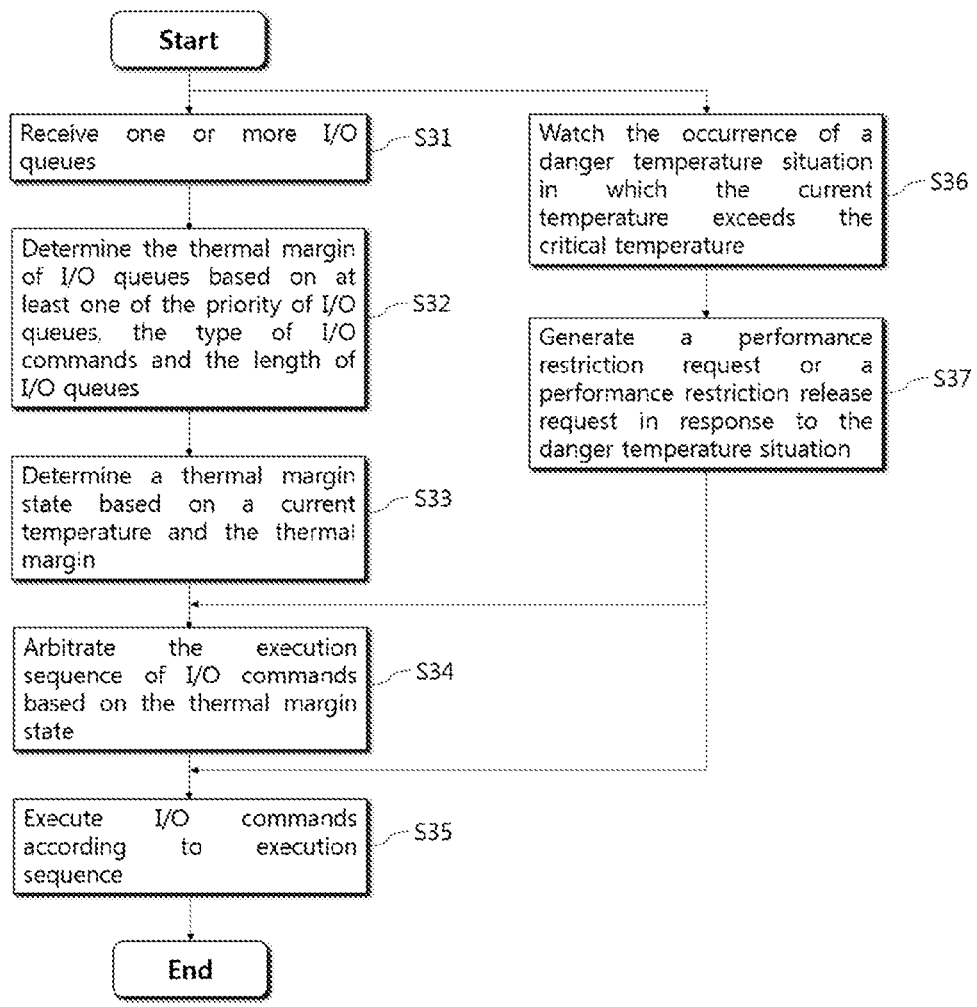
FIG. 8 is a flowchart illustrating a data access control method for a non-volatile data storage device capable of dynamically managing the generation of heat according to an embodiment.

FIG. 8 is a flowchart illustrating a data access control method for the non-volatile data storage device capable of dynamically managing the generation of heat according to an embodiment.

Referring to FIG. 8, the data access control method for the non-volatile data storage device including the one or more non-volatile memory modules may start with step S31 in which the non-volatile data storage device receives one or more I/O queue, including I/O commands regarding one or more logical storage spaces, from one or more hosts.

When garbage collection is determined to be required, the non-volatile data storage device may generate a garbage collection I/O queue using I/O commands regarding the processing of the garbage collection and a specific priority. The garbage collection I/O queue may be treated in the same manner as an I/O queue received from a host is treated.

At step S32, the non-volatile data storage device may determine the thermal margin of the I/O queue based on at least one of a priority assigned to the I/O queue, the type of I/O command and the length of the I/O queue.

The thermal margin may be defined as a difference between a critical temperature adapted to protect the non-volatile memory modules and a restrictive temperature adapted to cause the switching of the thermal margin state.

In an embodiment, at step S32, the non-volatile data storage device may determine the size of the thermal margin of the corresponding I/O queue to be smaller as the corresponding I/O queue has a higher priority, and thus may set the restrictive temperature of the corresponding I/O queue to a higher value.

In an embodiment, at step S32, the non-volatile data storage device may determine the size of the thermal margin of the corresponding I/O queue to be smaller as the corresponding I/O queue has a shorter length, and thus may set the restrictive temperature of the corresponding I/O queue to a higher value.

In an embodiment, at step S32, the non-volatile data storage device may determine the size of the thermal margin of a corresponding I/O queue to be small as the weighted sum of the length of the corresponding I/O queue and a value obtained by digitizing priority of the corresponding I/O queue decreases, and thus may set the restrictive temperature of the corresponding I/O queue to a high value.

In an embodiment, at step S32, the non-volatile data storage device may determine the size of the thermal margin to be small when I/O commands included in the corresponding I/O queue are read commands, and thus may set the restrictive temperature of the corresponding I/O queue to a high value.

In an embodiment, at step S32, the non-volatile data storage device may determine the size of the thermal margin to be large when I/O commands included in the corresponding I/O queue are program commands or flush commands or include I/O commands related to the processing of garbage collection, and thus may set the restrictive temperature of the corresponding I/O queue to a low value.

Thereafter, at step S33, the non-volatile data storage device may determine the thermal margin state of a corresponding I/O queue based on the current temperature and thermal margin of a non-volatile memory module selected for the corresponding I/O queue from among the non-volatile memory modules.

The thermal margin state may be determined to be a normal state in which the current temperature is lower than a restrictive temperature, or a restriction state in which the current temperature is higher than the restrictive temperature.

The non-volatile memory module selected for the I/O queue may be preferentially selected from among the non-volatile memory modules having a relatively low current temperature when the I/O queues include program commands issued by a host, flush commands or program commands based on garbage collection.

At step S34, the non-volatile data storage device may arbitrate an execution sequence in connection with I/O commands constituting the I/O queues based on the thermal margin states of the respective I/O queues.

In an embodiment, at step S34, the non-volatile data storage device may maintain or extend a burst size for I/O commands belonging to an I/O queue whose thermal margin state is the normal state, and may reduce a burst size for I/O commands belonging to an I/O queue whose thermal margin state is the restriction state.

Accordingly, the non-volatile data storage device may arbitrate the execution sequence of the I/O commands based on the burst size.

In an embodiment, at step S34, the non-volatile data storage device may set the priorities of the I/O queues again so that I/O commands belonging to an I/O queue whose thermal margin state is the normal state have priority over I/O commands belonging to an I/O queue whose thermal margin state is the restriction state.

Accordingly, the non-volatile data storage device may arbitrate the execution sequence of the I/O commands based on the priorities of the I/O queues.

In an embodiment, at step S34, the non-volatile data storage device may arbitrate the execution sequence of the I/O commands of at least one I/O queue according to weighted round robin arbitration based on the priorities of the I/O queues.

At step S35, the non-volatile data storage device may execute the I/O commands according to the arbitrated execution sequence.

In an embodiment, at step S36, the non-volatile data storage device may watch the occurrence of a danger temperature situation in which the current temperature of the non-volatile memory modules exceeds the critical temperature.

Furthermore, at step S37, the non-volatile data storage device may generate a performance restriction request for a non-volatile memory module in which the danger temperature situation has occurred and a performance restriction release request for a non-volatile memory module whose danger temperature situation has been terminated.

Accordingly, when the performance restriction request is generated at step S37, the non-volatile data storage device may delay the execution of I/O commands regarding a non-volatile memory module in which the danger temperature situation has occurred or regarding all the non-volatile memory modules at step S35 until the performance restriction release request is generated after the performance restriction request has been generated.

In an embodiment, the arbitration of the execution sequence may be delayed in response to the performance restriction request. In this case, when the performance restriction request is generated at step S37, the non-volatile data storage device may delay the arbitration of the execution sequence of I/O commands regarding a non-volatile memory module in which the danger temperature situation has occurred or regarding all the non-volatile memory modules at step S34 until the performance restriction release request is generated after the performance restriction request has been generated.

In an embodiment, when the performance restriction request is generated at step S36, the non-volatile data storage device may minimize the burst size of I/O queues regarding a non-volatile memory module in which the danger temperature situation has occurred or regarding all the non-volatile memory modules, or may set the priority of all the I/O queues, exclusive of a manager I/O queue, to a minimum value at step S34.

Figure 9:
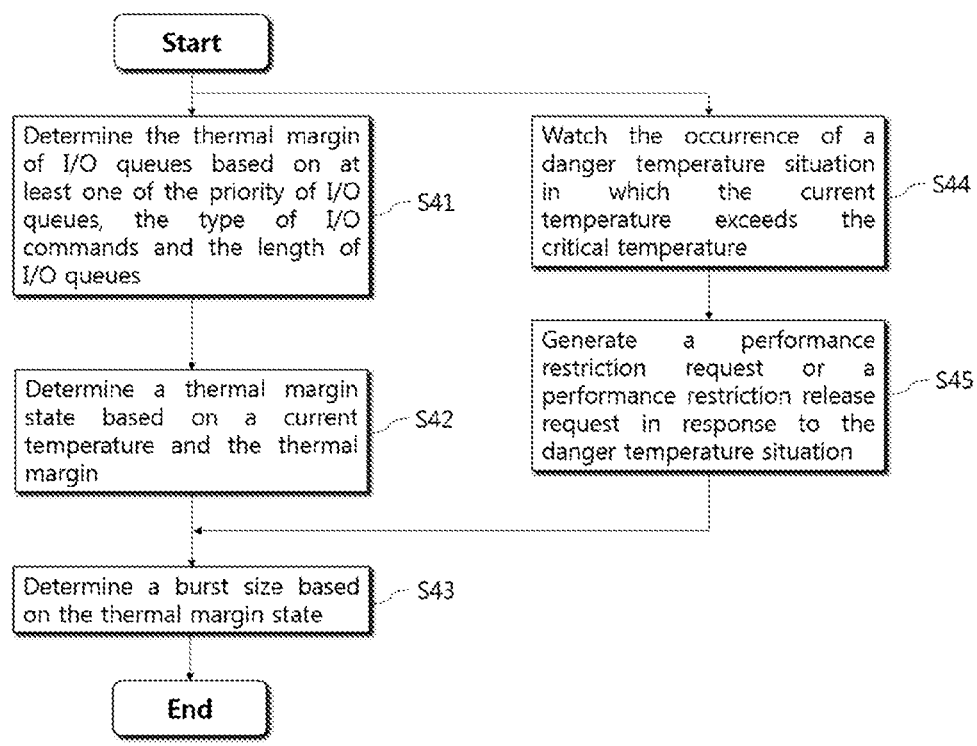
FIG. 9 is a flowchart illustrating a thermal management method for a non-volatile data storage device capable of dynamically managing the generation of heat according to an embodiment.

FIG. 9 is a flowchart illustrating a thermal management method for a non-volatile data storage device capable of dynamically managing the generation of heat according to an embodiment.

In the embodiment of FIG. 9, the non-volatile data storage device includes the one or more non-volatile memory modules, the I/O queue reception unit configured to receive one or more I/O queues including I/O commands regarding one or more logical storage spaces from one or more hosts, the execution sequence arbitration unit configured to arbitrate an execution sequence based on burst sizes for the I/O commands constituting the I/O queues, and the I/O command execution unit configured to execute the I/O commands according to the arbitrated execution sequence.

The thermal management method for the non-volatile data storage device may start with step S41 in which the thermal management apparatus determines the thermal margin of an I/O queue based on at least one of a priority assigned to the I/O queue, the type of I/O command and the length of the I/O queue.

The thermal margin may be defined as a difference between a critical temperature adapted to protect the non-volatile memory modules and a restrictive temperature adapted to cause the switching of the thermal margin state.

At step S42, the thermal management apparatus may determine the thermal margin state of the I/O queue based on the current temperature and thermal margin of a non-volatile memory module selected for the I/O queues from among the non-volatile memory modules.

The thermal margin state may be determined to be a normal state in which the current temperature is lower than a restrictive temperature, or a restriction state in which the current temperature is higher than the restrictive temperature.

At step S43, the thermal management apparatus may determine a burst size by maintaining or extending the burst size of I/O commands belonging to an I/O queue whose thermal margin state is the normal state and reducing the burst size of I/O commands belonging to an I/O queue whose thermal margin state is the restriction state.

Accordingly, the execution sequence arbitration unit of the non-volatile data storage device may dynamically manage the generation of heat by arbitrating the execution sequence of the I/O commands based on determined burst size.

In an embodiment, at step S44, the thermal management apparatus may watch the occurrence of a danger temperature situation in which the current temperature of the non-volatile memory modules exceeds the critical temperature.

At step S45, the thermal management apparatus may generate a performance restriction request for a non-volatile memory module in which the danger temperature situation has occurred or a performance restriction release request for a non-volatile memory module whose danger temperature situation has been terminated.

In an embodiment, the thermal management apparatus may send the performance restriction request or the performance restriction release request to the I/O command execution unit of the non-volatile data storage device. In this case, the I/O command execution unit may delay the execution of I/O commands regarding a non-volatile memory module in which the danger temperature situation has occurred or regarding all the non-volatile memory modules until the performance restriction release request is generated after the performance restriction request has been generated.

In an embodiment, the thermal management apparatus may send the performance restriction request or the performance restriction release request to the execution sequence arbitration unit of the non-volatile data storage device.

In this case, the execution sequence arbitration unit of the non-volatile data storage device may delay the arbitration of the execution sequence of I/O commands regarding a non-volatile memory module in which the danger temperature situation has occurred or regarding all the non-volatile memory modules until the performance restriction release request is generated after the performance restriction request has been generated.

In an embodiment, the thermal management apparatus may minimize the burst size of I/O queues regarding a non-volatile memory module in which the danger temperature situation has occurred or regarding all the non-volatile memory modules when the performance restriction request or the performance restriction release request is generated.

Figure 10:
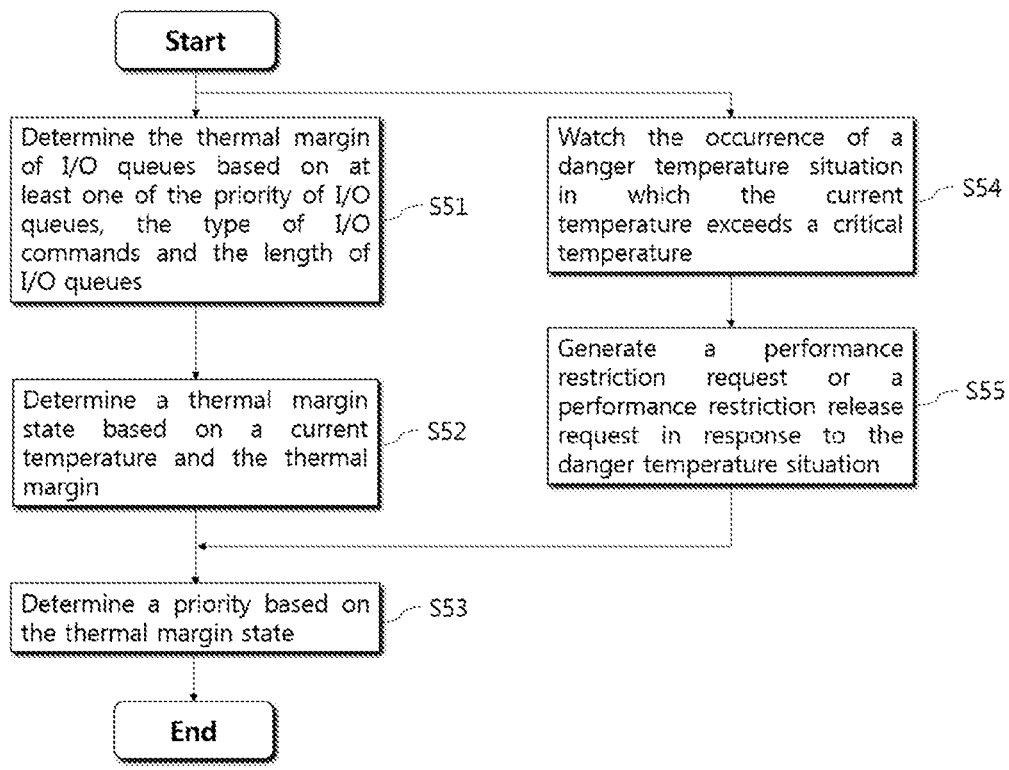
FIG. 10 is a flowchart illustrating a thermal management method for a non-volatile data storage device capable of dynamically managing the generation of heat according to an embodiment.

FIG. 10 is a flowchart illustrating a thermal management method for a non-volatile data storage device capable of dynamically managing the generation of heat according to an embodiment.

In the embodiment of FIG. 10, the non-volatile data storage device may include the one or more non-volatile memory modules, the I/O queue reception unit configured to receive one or more I/O queues including I/O commands regarding one or more logical storage spaces from one or more hosts, the execution sequence arbitration unit configured to arbitrate an execution sequence based on priorities in connection with the I/O commands constituting the I/O queues, and the I/O command execution unit configured to execute the I/O commands according to the arbitrated execution sequence.

The thermal management method for a non-volatile data storage device may start with step S51 in which the thermal management apparatus determines the thermal margin of an I/O queue based on at least one of a priority assigned to the I/O queue, the type of I/O command and the length of the I/O queue.

The thermal margin may be defined as a difference between a critical temperature adapted to protect the non-volatile memory modules and a restrictive temperature adapted to cause the switching of the thermal margin state.

At step S52, the thermal management apparatus may determine the thermal margin state of the I/O queue based on the current temperature and thermal margin of a non-volatile memory module selected for the I/O queues from among the non-volatile memory modules.

The thermal margin state may be determined to be a normal state in which the current temperature is lower than a restrictive temperature or a restriction state in which the current temperature is higher than the restrictive temperature.

At step S53, the thermal management apparatus may set the priorities of the I/O queues again so that I/O commands belonging to an I/O queue whose thermal margin state is the normal state have priority over I/O commands belonging to an I/O queue whose thermal margin state is the restriction state.

Accordingly, the execution sequence arbitration unit of the non-volatile data storage device may dynamically manage the generation of heat by arbitrating the execution sequence of the I/O commands based on determined burst size.

In an embodiment, at step S54, the thermal management apparatus may watch the occurrence of a danger temperature situation in which the current temperature of the non-volatile memory modules exceeds the critical temperature.

At step S55, the thermal management apparatus may generate a performance restriction request for a non-volatile memory module in which the danger temperature situation has occurred or a performance restriction release request for a non-volatile memory module whose danger temperature situation has been terminated.

In an embodiment, the thermal management apparatus may send the performance restriction request or the performance restriction release request to the I/O command execution unit of the non-volatile data storage device. In this case, the I/O command execution unit may delay the execution of I/O commands regarding a non-volatile memory module in which the danger temperature situation has occurred or regarding all the non-volatile memory modules until the performance restriction release request is generated after the performance restriction request has been generated.

In an embodiment, the thermal management apparatus may send the performance restriction request or the performance restriction release request to the execution sequence arbitration unit of the non-volatile data storage device.

In this case, the execution sequence arbitration unit of the non-volatile data storage device may delay the arbitration of the execution sequence of I/O commands regarding a non-volatile memory module in which the danger temperature situation has occurred or regarding all the non-volatile memory modules until the performance restriction release request is generated after the performance restriction request has been generated.

In an embodiment, when the performance restriction request or the performance restriction release request is generated, the thermal management apparatus may set the priority of all the I/O queues, exclusive of a manager I/O queue, to a minimum value for a non-volatile memory module in which the danger temperature situation has occurred or for all the non-volatile memory modules.

As described above, the thermal management method and apparatus for a semiconductor processor device using a dynamic thermal margin according to the embodiments may easily operate in conjunction with a hardware temperature management scheme for a semiconductor processor device through a change in voltage and/or frequency.

According to the thermal management method and apparatus for a semiconductor processor device and non-volatile data storage device using a dynamic thermal margin according to the embodiments, required performance based on importance and priority may be guaranteed by scaling a thermal margin based on the importance of a task or the priority of threads.

The non-volatile data storage device and the data access control method according to the embodiments may control the generation of heat in a software manner while being compatible with a non-volatile memory interface standard.

The non-volatile data storage device and data access control method according to the embodiments can provide performance varying depending on the importance of a request that is being processed.

Advantages are not limited to the above-described advantages, and other advantages that have not been described may be readily understood by those skilled in the art from the above description.

The thermal margin determination units 110 and 210, thermal margin state determination units 120 and 220, the policy determination unit 130, performance state determination unit 150, scheduler 140, the processor core setting unit 12, the performance restriction watch unit 240, the dynamic performance control unit 230, the I/O command execution unit 24, the execution sequence arbitration unit 23, and the I/O queue reception unit 22 in FIGS. 1 and 6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-5 and 7-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, a device or apparatus as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A semiconductor processor device, comprising:
   a thermal margin determination unit configured to determine a thermal margin of the semiconductor processor device based on any one of a priority of threads being executed on one or more processor cores of the semiconductor processor device and a load of the one or more processor cores;
   a thermal margin state determination unit configured to determine a thermal margin state of the semiconductor processor device based on a current temperature of the semiconductor processor device and the thermal margin;
   a policy determination unit configured to determine a thermal management policy regarding the processor cores based on the thermal margin state; and
   a processor core setting unit configured to set activation, voltage, and frequency of the processor cores in compliance with the thermal management policy,
   wherein the thermal margin defines a difference between a critical temperature of the semiconductor processor device, which is a temperature adapted to protect the semiconductor processor device, and a restrictive temperature of the semiconductor processor device, which is a temperature adapted to cause a change in the thermal management policy, and
   wherein the thermal margin state is determined to be a state in which the current temperature is lower than the restrictive temperature or a state in which the current temperature is not lower than the restrictive temperature.

2. The semiconductor processor device of claim 1, wherein the thermal margin determination unit is further configured to reduce the thermal margin, in response to the priority of the threads becoming higher or the load of the processor cores becoming higher.

3. The semiconductor processor device of claim 1, wherein
   the thermal margin state determination unit is further configured to determine the thermal margin state to be a first state, in response to the current temperature being lower than the restrictive temperature, and to determine the thermal margin state to be a second state, in response to the current temperature being higher than the restrictive temperature, and
   the policy determination unit is further configured to maintain a current thermal management policy while the thermal margin state is the first state, and to repeatedly watch a change in the thermal management policy and a change in current temperature based on a changed thermal management policy until the current temperature becomes lower than the restrictive temperature while the thermal margin state is in the second state.

4. The semiconductor processor device of claim 1, wherein
   the thermal margin state determination unit is further configured to
   maintain a current thermal margin state in a first state when the current temperature is lower than the restrictive temperature, and switch the current thermal margin state from the first state to a second state, in response to the current temperature being higher than the restrictive temperature switch the current thermal margin state to a third state, in response to the thermal management policy being changed while the current thermal margin state is in the second state, and switch the current thermal margin state to the second state, in response to the current temperature being higher than a secondary restrictive temperature while the current thermal margin state is in the third state, maintain the current thermal margin state in the third state when the current temperature is lower than the secondary restrictive temperature and is higher than a return temperature, and switch the current thermal margin state to the first state, in response to the current temperature being lower than the return temperature, and the policy determination unit is further configured to maintain the current thermal management policy while the thermal margin state is in the first state, and to determine the thermal management policy so that the current temperature is lower than the secondary restrictive temperature or the return temperature while the thermal margin state is in the second state.

5. A thermal management apparatus, comprising:

a thermal margin determination unit configured to determine a thermal margin of a semiconductor processor device based on any one of a priority of threads being executed on one or more processor cores of the semiconductor processor device and a load of the one or more processor cores;

a thermal margin state determination unit configured to determine a thermal margin state of the semiconductor processor device based on a current temperature of the semiconductor processor device and the thermal margin; and a policy determination unit configured to determine a thermal management policy regarding the one or more processor cores based on the thermal margin state, wherein the thermal margin defines a difference between a critical temperature of the semiconductor processor device, which is a temperature adapted to protect the semiconductor processor device, and a restrictive temperature of the semiconductor processor device, which is a temperature adapted to cause a change in the thermal management policy, and wherein the thermal margin state is determined to be a state in which the current temperature of the semiconductor processor device is lower than the restrictive temperature or a state in which the current temperature is not lower than the restrictive temperature.

6. The thermal management apparatus of claim 5, wherein the thermal margin determination unit is further configured to reduce the thermal margin, in response to the priority of the threads becoming higher or the load of the one or more processor cores becoming higher.

7. The thermal management apparatus of claim 5, wherein the thermal margin state determination unit is further configured to determine the thermal margin state to be a first state, in response to the current temperature being lower than the restrictive temperature, and to determine the thermal margin state to be a second state, in response the current temperature being higher than the restrictive temperature; and the policy determination unit is further configured to maintain a current thermal management policy while the thermal margin state is in the first state, and to repeatedly watch a change in the thermal management policy and a change in current temperature based on a changed thermal management policy until the current temperature is lower than the restrictive temperature while the thermal margin state is in the second state.

8. The thermal management apparatus of claim 5, wherein the thermal margin state determination unit is further configured to maintain a current thermal margin state in a first state when the current temperature is lower than the restrictive temperature while a current thermal margin state is in the first state, and switch the current thermal margin state from the first state to a second state, in response to the current temperature being higher than the restrictive temperature, switch the current thermal margin state to a third state, in response to the thermal management policy being changed while the current thermal margin state is in the second state, and switch the current thermal margin state to the second state, in response to the current temperature being higher than a secondary restrictive temperature while the current thermal margin state is in the third state, maintain the current thermal margin state in the third state when the current temperature is lower than the secondary restrictive temperature and is higher than a return temperature, and switch the current thermal margin state to the first state, in response to the current temperature being lower than the return temperature, and the policy determination unit is further configured to maintain the current thermal management policy while the thermal margin state is in the first state or the third state, and to determine the thermal management policy so that the current temperature is lower than the secondary restrictive temperature or the return temperature while the thermal margin state is in the second state.

9. The thermal management apparatus of claim 8, wherein the secondary restrictive temperature and the return temperature are determined based on the thermal margin.

10. The thermal management apparatus of claim 5, wherein the current load comprises a load related to processing of priority threads of threads being executed on the one or more processor cores.

11. The thermal management apparatus of claim 5, further comprising a scheduler configured to classify threads being executed on the one or more processor cores into priority threads and non-priority threads, and to control time slices allocated to the non-priority threads in compliance with a thermal management policy.

12. The thermal management apparatus of claim 5, further comprising a high performance burst situation watch unit configured to detect a high performance burst situation in which a load related to priority threads of threads being executed on the one or more processor cores exceeds a threshold load, and to generate a high performance burst request, in response to the high performance burst situation being detected;

wherein the policy determination unit is further configured to select a processor core setting providing higher performance than a current performance, from among a plurality of processor core settings, in response to a high performance burst request being received from the high performance burst situation watch unit, and to determine a thermal management policy based on the selected processor core setting.

13. A thermal management method for a semiconductor processor device comprising one or more processor cores, comprising:

determining a thermal margin of the semiconductor processor device based on any one of a priority of threads being executed on the one or more processor cores and a load of the one or more processor cores;

determining a thermal margin state of the semiconductor processor device based on a current temperature of the semiconductor processor device and the thermal margin; and determining a thermal management policy regarding the processor cores based on the thermal margin state, wherein the thermal margin defines a difference between a critical temperature of the semiconductor processor device, which is a temperature adapted to protect the semiconductor processor device, and a restrictive temperature of the semiconductor processor device, which is a temperature adapted to cause a change in the thermal management policy, and wherein the thermal margin state is determined to be a state in which the current temperature is lower than the restrictive temperature or a state in which the current temperature is not lower than the restrictive temperature.

14. The thermal management method of claim 13, further comprising controlling activation, voltage, and frequency of the one or more processor cores in compliance with the thermal management policy.

15. The thermal management method of claim 13, wherein the determining of the thermal margin comprises reducing the thermal margin, in response to the priority of the threads becoming higher or the load of the one or more processor cores becoming larger.

16. The thermal management method of claim 13, wherein the determining of the thermal margin state comprises determining the thermal margin state to be a first state, in response to a current temperature being lower than the restrictive temperature, and determining the thermal margin state to be a second state, in response to the current temperature being higher than the restrictive temperature, and the determining of the thermal management policy comprises maintaining the current thermal management policy while the thermal margin state is in the first state, and repeatedly watching a change in the thermal management policy and a change in the current temperature based on a changed thermal management policy until the current temperature is lower than the restrictive temperature while the thermal margin state is in the second state.

17. The thermal management method of claim 13, wherein determining the thermal margin state comprises
maintaining the current thermal margin state in a first state when the current temperature is lower than the restrictive temperature while the current thermal margin state is in the first state, and switching the current thermal margin state from the first state to a second state, in response to the current temperature being higher than the restrictive temperature, switching the current thermal margin state to a third state, in response to the thermal management policy being changed while the current thermal margin state is in the second state, and switching the current thermal margin state to the second state, in response to the current temperature being higher than a secondary restrictive temperature while the current thermal margin state is in the third state, maintaining the current thermal margin state in the third state when the current temperature is lower than the secondary restrictive temperature but is higher than a return temperature, and switching the current thermal margin state to the first state, in response to the current temperature being lower than the return temperature, and the determining of the thermal management policy comprises maintaining the current thermal management policy while the thermal margin state is in the first state, and determining the thermal management policy so that the current temperature is lower than the secondary restrictive temperature or the return temperature while the thermal margin state is in the second state.

18. The thermal management method of claim 13, further comprising classifying threads being executed on the one or more processor cores into priority threads and non-priority threads, and controlling time slices allocated to the non-priority threads in compliance with the thermal management policy.

19. The thermal management method of claim 13, further comprising detecting an occurrence of a high performance burst situation in which a load related to priority threads of threads being executed on the processor cores exceeds a threshold load, and generating a high performance burst request, in response to the high performance burst situation being detected, wherein the determining of the thermal management policy comprises selecting a processor core setting providing higher performance than a current performance, from among a plurality of processor core settings, in response to a high performance burst request, and determining the thermal management policy based on the selected processor core setting.

20. A non-transitory computer-readable storage medium storing instructions that, when executed by a processor, cause the processor to perform the method of claim 13.

21. A non-volatile data storage device, comprising:
one or more non-volatile memory modules;
an I/O queue reception unit configured to receive I/O queues including I/O commands regarding one or more logical storage spaces from one or more hosts;
a thermal margin determination unit configured to determine a thermal margin of the one or more non-volatile memory modules for the I/O queues based on any one or any combination of any two or more of a priority assigned to the I/O queues, a type of I/O commands, and a length of the I/O queues;
a thermal margin state determination unit configured to determine thermal margin states of the one or more non-volatile memory modules for the I/O queues based on the thermal margin and a current temperature of a non-volatile memory module on which the I/O queues are selected to be executed from among the one or more non-volatile memory modules;
an execution sequence arbitration unit configured to arbitrate an execution sequence of the I/O commands constituting the I/O queues based on the thermal margin states, which are of the respective I/O queues; and
an I/O command execution unit configured to execute the I/O commands based on the arbitrated execution sequence,
wherein the thermal margin defines a difference between a critical temperature adapted to protect the one or more non-volatile memory modules and a restrictive temperature adapted to cause switching of the thermal margin state, and wherein the thermal margin state is determined to be a normal state, in which the current temperature is lower than the restrictive temperature, or a restriction state, in which the current temperature is higher than the restrictive temperature.

22. The non-volatile data storage device of claim 21, wherein the thermal margin determination unit is configured to determine reduce the thermal margins, in response to a priority assigned to the I/O queue by the host being higher when the I/O queues include read commands or a length of the I/O queues is shorter.

23. The non-volatile data storage device of claim 21, wherein the execution sequence arbitration unit is further configured to maintain or extend a burst size for I/O commands belonging to an I/O queue, among the I/O queues, having the thermal margin state of that is the normal state, to reduce a burst size for I/O commands belonging to an I/O queue, among the I/O queues, having the thermal margin state of the restriction state, and to arbitrate the execution sequence of the I/O commands based on the burst size.

24. The non-volatile data storage device of claim 21, wherein the execution sequence arbitration unit is further configured to reset the priority of the I/O queues so that I/O commands belonging to an I/O queue, among the I/O queues, having the thermal margin state that is the normal state have priority over I/O commands belonging to an I/O queue, among the I/O queues, having the thermal margin state of the restriction state, and to arbitrate an execution sequence of the I/O commands based on the priority.

25. The non-volatile data storage device of claim 24, wherein the execution sequence arbitration unit is further configured to arbitrate an execution sequence of I/O commands of at least one of the I/O queues according to weighted round robin arbitration based on the priority.

26. The non-volatile data storage device of claim 21, further comprising a performance restriction watch unit configured to detect a danger temperature situation in which the current temperature of the non-volatile memory modules exceeds the critical temperature, and to generate a performance restriction request for a non-volatile memory module, among the one or more non-volatile memory modules, in which the danger temperature situation has occurred and a performance restriction release request for a non-volatile memory module in which the danger temperature situation is terminated, wherein the I/O command execution unit is further configured to delay execution of I/O commands regarding a non-volatile memory module in which the danger temperature situation occurs until a performance restriction release request is received from the performance restriction watch unit.

27. The non-volatile data storage device of claim 21, wherein a volatile memory module accessed in connection with the I/O queue is preferentially selected from among non-volatile memory modules, among the one or more non-volatile memory modules, which have a relatively low current temperature when the I/O queues include program commands issued by a host, flush commands or programs command based on garbage collection.

28. The non-volatile data storage device of claim 27, further comprising a garbage collection processing unit configured to monitor non-volatile memory modules, requiring garbage collection, among the one or more non-volatile memory modules, to generate a garbage collection I/O queue including I/O commands related to processing of garbage collection and having a specific priority when garbage collection is determined to be required, and to send the garbage collection I/O queue to the I/O queue reception unit.

29. A thermal management apparatus for a non-volatile data storage device including one or more non-volatile memory modules, an I/O queue reception unit configured to receive I/O queues including I/O commands regarding one or more logical storage spaces from one or more hosts, an execution sequence arbitration unit configured to arbitrate an execution sequence based on a burst size in connection with the I/O commands constituting the I/O queues, and an I/O command execution unit configured to execute the I/O commands according to the arbitrated execution sequence, the thermal management apparatus comprising:

a thermal margin determination unit configured to determine thermal margins of the one or more non-volatile memory modules for the I/O queues based on any one or any combination of any two or more of a priority assigned to the I/O queues, a type of I/O commands, and a length of the I/O queues;

a thermal margin state determination unit configured to determine thermal margin states of the one or more non-volatile memory modules for the I/O queues based on the thermal margins and a current temperature of a non-volatile memory module on which the I/O queues are selected to be executed from among the one or more non-volatile memory modules; and a dynamic performance control unit configured to maintain or extend a burst size for I/O commands belonging to an I/O queue, among the I/O queues, having a thermal margin state, among the thermal margin states, of a normal state, and to reduce a burst size for I/O commands belonging to an I/O queue, among the I/O queues, having the a thermal margin state, among the thermal margin states, of a restriction state, wherein the thermal margins define a difference between a critical temperature adapted to protect the one or more non-volatile memory modules and a restrictive temperature adapted to cause switching of the thermal margin states, and wherein a thermal margin state, among the thermal margin states, is determined to be the normal state, in which the current temperature is lower than the restrictive temperature, or the restriction state, in which the current temperature is higher than the restrictive temperature.

30. A thermal management apparatus for a non-volatile data storage device including one or more non-volatile memory modules, an I/O queue reception unit configured to receive I/O queues including I/O commands regarding one or more logical storage spaces from one or more hosts, an execution sequence arbitration unit configured to arbitrate an execution sequence based on a priority in connection with the I/O commands constituting the I/O queues, and an I/O command execution unit configured to execute the I/O commands according to the arbitrated execution sequence, the thermal management apparatus comprising:

a thermal margin determination unit configured to determine thermal margins of the one or more non-volatile memory modules for the I/O queues based on at least one of a priority assigned to the I/O queues, a type of I/O commands, and a length of the I/O queues;

a thermal margin state determination unit configured to determine thermal margin states of the one or more non-volatile memory modules for the I/O queues based on the thermal margins and a current temperature of a non-volatile memory module on which the I/O queues are selected to be executed from among the one or more non-volatile memory modules; and a dynamic performance control unit configured to maintain or extend a burst size for I/O commands belonging to an I/O queue, among the I/O queues, having a thermal margin state, among the thermal margin states, of a normal state, and to reduce a burst size for I/O commands belonging to an I/O queue, among the I/O queues, having a thermal margin state, among the thermal margin states, of a restriction state, wherein the thermal margins define a difference between a critical temperature adapted to protect the one or more non-volatile memory modules and a restrictive temperature adapted to cause switching of the thermal margin states, and wherein a thermal margin state, among the thermal margin states, is determined to be a normal state, in which the current temperature is lower than the restrictive temperature, or a restriction state, in which the current temperature is higher than the restrictive temperature.

31. A data access control method for a non-volatile data storage device comprising one or more non-volatile memory modules, the data access control method comprising:

receiving one or more I/O queues comprising I/O commands regarding one or more logical storage spaces from one or more hosts;

determining a thermal margin of the one or more non-volatile memory modules for an I/O queue, among the I/O queues, based on any one or any combination of any two or more of a priority assigned to the I/O queues, a type of I/O commands, and a length of the I/O queues;

determining a thermal margin state of the one or more non-volatile memory modules for the I/O queue based on a current temperature of the one or more non-volatile memory modules and the thermal margin, which is of a non-volatile memory module on which the I/O queues are selected to be executed from among the non-volatile memory modules;

arbitrating an execution sequence in connection with the I/O commands which constitute the I/O queues based on the thermal margin state; and executing the I/O commands according to the arbitrated execution sequence, wherein the thermal margin defines a difference between a critical temperature adapted to protect the non-volatile memory modules and a restrictive temperature adapted to cause switching of the thermal margin state, and wherein the thermal margin state is determined to be a normal state in which the current temperature is lower than the restrictive temperature or a restriction state in which the current temperature is higher than the restrictive temperature.

32. The data access control method of claim 31, wherein the thermal margin is reduced, in response to the priority assigned to the I/O queue by the host becoming higher when the I/O queues include read commands or a length of the I/O queues is shorter.

33. The data access control method of claim 31, wherein the arbitrating of the execution sequence comprises maintaining or extending a burst size for I/O commands belonging to an I/O queue, among the I/O queues, having the thermal margin state of the normal state, reducing a burst size for I/O commands belonging to an I/O queue, among the I/O queues, having the thermal margin state of the restriction state, and arbitrating the execution sequence of the I/O commands based on the burst size.

34. The data access control method of claim 31, wherein the arbitrating of the execution sequence comprises resetting a priority of I/O queues so that I/O commands, among the I/O commands, belonging to an I/O queue, among the I/O queues, having the thermal margin state of the normal state have priority over I/O commands, among the I/O commands, belonging to an I/O queue, among the I/O queues, having the thermal margin state of the restriction state, and arbitrating the execution sequence of the I/O commands based on the priority.

35. The data access control method of claim 34, wherein the arbitrating the of execution sequence comprises arbitrating an execution sequence of I/O commands, among the I/O commands, of at least one I/O queue according to weighted round robin arbitration based on the priority.

36. The data access control method of claim 31, further comprising detecting an occurrence of a danger temperature situation in which the current temperature of the non-volatile memory modules exceeds the critical temperature, and generating a performance restriction request for a non-volatile memory module, among the one or more non-volatile memory modules, in which the danger temperature situation has occurred and a performance restriction release request for a non-volatile memory module, among the one or more non-volatile memory modules, in which the danger temperature situation is terminated, wherein the executing of the I/O commands comprises delaying an execution of I/O commands regarding a non-volatile memory module, among the one or more non-volatile memory modules, in which the danger temperature situation has occurred until a performance restriction release request is received, in response to a performance restriction request is received from the performance restriction watch unit.

37. The data access control method of claim 31, wherein a non-volatile memory module accessed in connection with the I/O queues is preferentially selected from among non-volatile memory modules, among the one or more non-volatile memory modules, having a relatively low current temperature when the I/O queues include program commands issued by a host, flush commands or program commands based on garbage collection.

38. The data access control method of claim 37, further comprising generating a garbage collection I/O queue using I/O commands and a specific priority regarding processing of garbage collection, in response to the garbage collection being determined to be required.

39. A non-transitory computer-readable storage medium storing instructions that, when executed by a processor, cause the processor to perform the method of claim 31.

40. A thermal management method for a non-volatile data storage device including one or more non-volatile memory modules, an I/O queue reception unit configured to receive one or more I/O queues including I/O commands regarding one or more logical storage spaces from one or more hosts, an execution sequence arbitration unit configured to arbitrate an execution sequence based on a burst size in connection with the I/O commands constituting the I/O queues, and an I/O command execution unit configured to execute the I/O commands according to the arbitrated execution sequence, the thermal management method comprising:

determining a thermal margin of the one or more non-volatile memories for an I/O queue, among the I/O queues, based on at least one of a priority assigned to the I/O queues, a type of I/O commands, and a length of the I/O queues;

determining a thermal margin state of the one or more non-volatile memories for the I/O queue based on the thermal margin and a current temperature of a non-volatile memory module on which the I/O queues are selected to be executed from among the non-volatile memory modules; and determining a burst size by maintaining or extending a burst size for I/O commands belonging to an I/O queue, among the I/O queues, having the thermal margin state of a normal state, and reducing a burst size for I/O commands belonging to an I/O queue, among the I/O queues, having the thermal margin state of a restriction state, wherein the thermal margin defines a difference between a critical temperature adapted to protect the non-volatile memory modules and a restrictive temperature adapted to cause switching of the thermal margin state, and wherein the thermal margin state is determined to be the normal state, in which the current temperature is lower than the restrictive temperature, or the restriction state, in which the current temperature is higher than the restrictive temperature.

41. The thermal management method of claim 40, further comprising:

detecting an occurrence of a danger temperature situation in which the current temperature exceeds the critical temperature; and generating a performance restriction request for a non-volatile memory module, among the one or more non-volatile memory modules, in which the danger temperature situation occurs, and a performance restriction release request for a non-volatile memory module, among the one or more non-volatile memory modules, in which the danger temperature situation is terminated.

42. A thermal management method for a non-volatile data storage device including one or more non-volatile memory modules, an I/O queue reception unit configured to receive one or more I/O queues including I/O commands regarding one or more logical storage spaces from one or more hosts, an execution sequence arbitration unit configured to arbitrate an execution sequence based on a burst size in connection with the I/O commands constituting the I/O queues, and an I/O command execution unit configured to execute the I/O commands according to the arbitrated execution sequence, the thermal management method comprising:

determining thermal margins of the one or more non-volatile memory modules for the I/O queues based on any one or any combination of any two or more of a priority assigned to the I/O queues, a type of I/O commands, and a length of the I/O queues;

determining thermal margin states of the one or more non-volatile memory modules for the I/O queues based on the thermal margins and a current temperature of a non-volatile memory module on which the I/O queues are selected to be executed from among the one or more non-volatile memory modules; and resetting the priority so that I/O commands belonging to an I/O queue, among the I/O queues, having a thermal margin state, among the thermal margin states, of a normal state have priority over I/O commands belonging to an I/O queue, among the I/O queues, having thermal margin states, among the thermal margin states, of a restriction state, wherein a thermal margin, among the thermal margins, defines a difference between a critical temperature adapted to protect the one or more non-volatile memory modules and a restrictive temperature adapted to cause switching of the thermal margin state, and wherein a thermal margin state, among the thermal margin states, is determined to be the normal state in which the current temperature is lower than the restrictive temperature or the restriction state in which the current temperature is higher than the restrictive temperature.

43. The thermal management method of claim 42, further comprising:

detecting occurrence of a danger temperature situation in which the current temperature of the one or more non-volatile memory modules exceeds the critical temperature; and generating a performance restriction request for a non-volatile memory module, among the one or more non-volatile memory modules, in which the danger temperature situation occurs and generating a performance restriction release request for a non-volatile memory module, among the one or more non-volatile memory modules, in which the danger temperature situation is terminated.

44. A non-transitory computer-readable storage medium storing instructions that, when executed by a processor, cause the processor to perform the method of claim 42.

* * * * *